(12) United States Patent
Gil

(10) Patent No.: US 6,464,355 B1
(45) Date of Patent: Oct. 15, 2002

(54) OPHTHALMIC LENS SYNTHESIZED FROM ITS SPECIFICATION

(75) Inventor: Thieberger Gil, 22 Hana Senesh Street, Kiryat Tivon, 36036 (IL)

(73) Assignee: Thieberger Gil, Kiryat Tivon (IL)

( * ) Notice: Subject to any disclaimer, the term of this patent is extended or adjusted under 35 U.S.C. 154(b) by 0 days.

(21) Appl. No.: 09/513,463

(22) Filed: Feb. 25, 2000

Related U.S. Application Data

(60) Provisional application No. 60/056,062, filed on Sep. 2, 1997.

(51) Int. Cl.$^7$ .................................................. G02C 7/02
(52) U.S. Cl. ....................................................... 351/177
(58) Field of Search .............................. 351/159, 160 R, 351/160 H, 161, 163–164, 166, 168–169, 177; 623/6.23–6.29, 6.32–6.33

(56) References Cited

U.S. PATENT DOCUMENTS

| | | | |
|---|---|---|---|
| 3,904,281 A | 9/1975 | Jampolsky | 351/159 |
| 4,162,122 A * | 7/1979 | Cohen | 351/161 |
| 4,787,733 A | 11/1988 | Silva | 351/177 |
| 5,608,471 A * | 3/1997 | Miller | 351/161 |
| 5,755,786 A * | 5/1998 | Woffinden et al. | 623/15 |

\* cited by examiner

*Primary Examiner*—Jordan M. Schwartz

(57) ABSTRACT

This invention relates to a novel prescription lens (58), mainly suited for ophthalmic applications. The lens designer defines the macroscopic surfaces of the lens (59, 60) as desired. The design process assumes that the location of the object (50), the lens (51), and the required image (53) are known. By using Ray-tracing technique we calculate the microscopic normals to the lens that will form the required image. From those microscopic normals we calculate microscopic surface by a process of summation the slopes with geometric pattern conditions. The final surface is not smooth but contains plenty of dense microscopic shapes that look like saw-teeth. That rough surface enables the lens to have almost any desired shape and thickness.

31 Claims, 15 Drawing Sheets

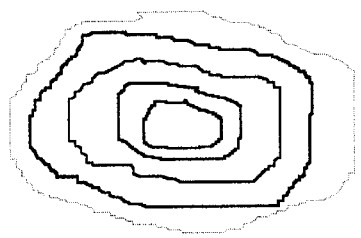
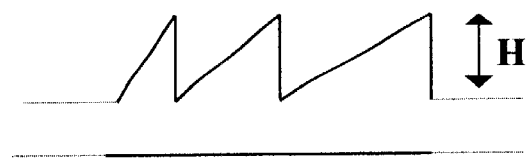
*FIG. 16A*  *FIG. 16B*
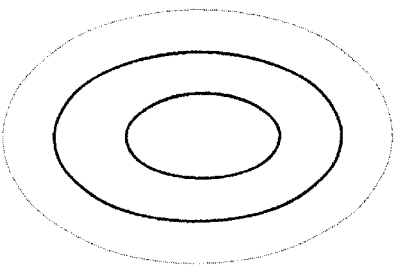
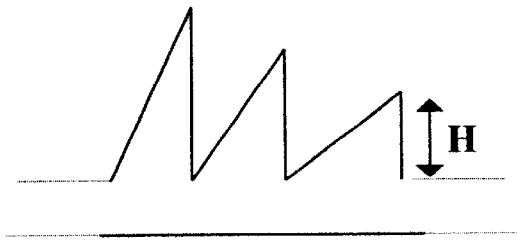
*FIG. 17A*  *FIG. 17B*
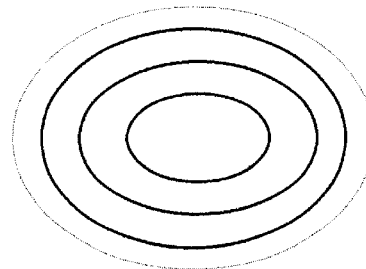
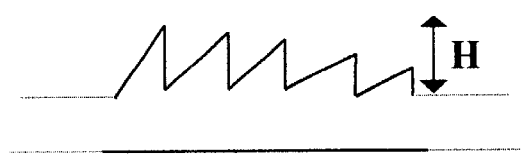
*FIG. 18A*  *FIG. 18B*
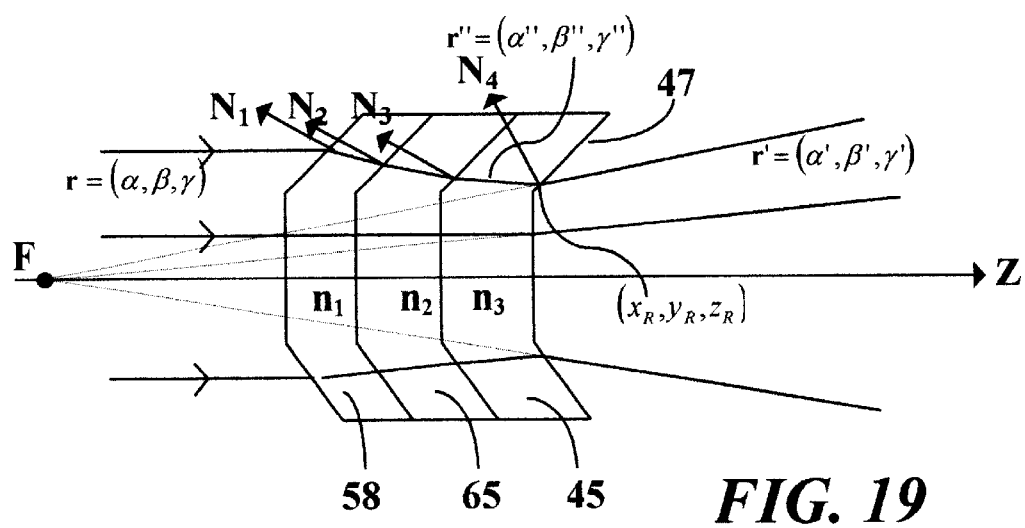
*FIG. 19*

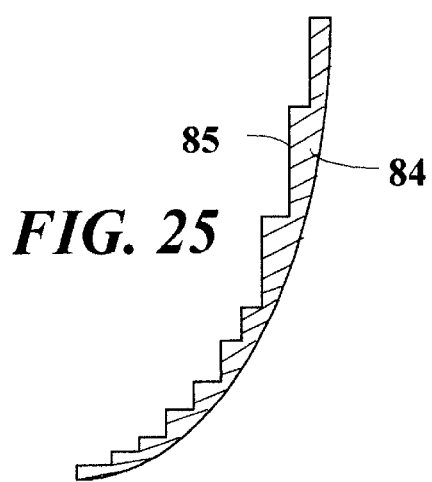
FIG. 25
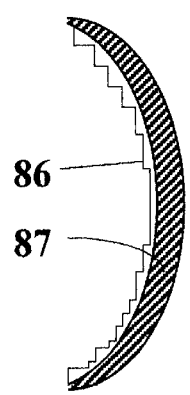
FIG. 26
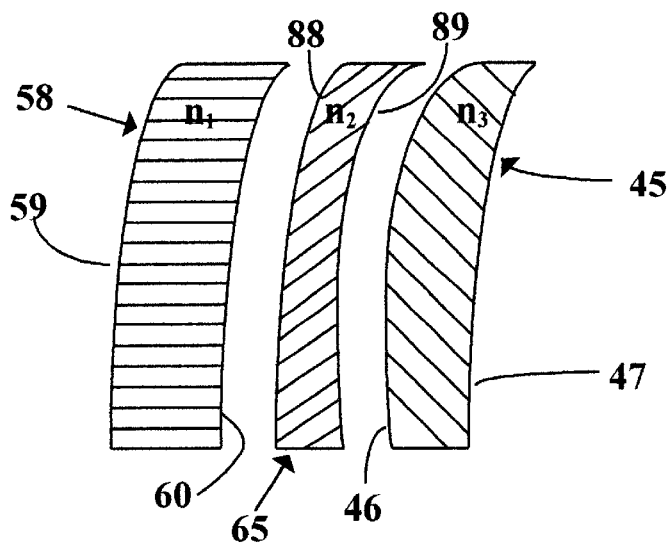
FIG. 27
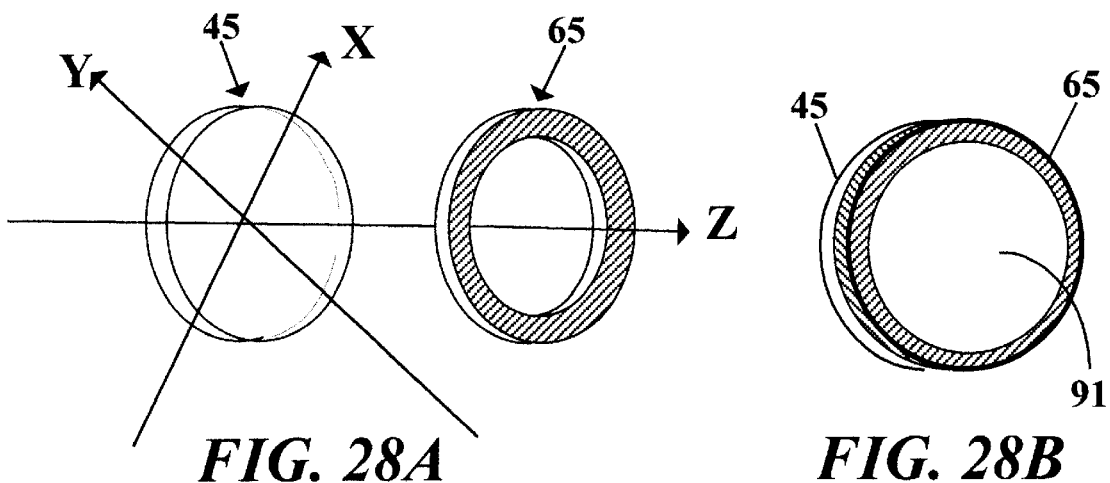
FIG. 28A      FIG. 28B

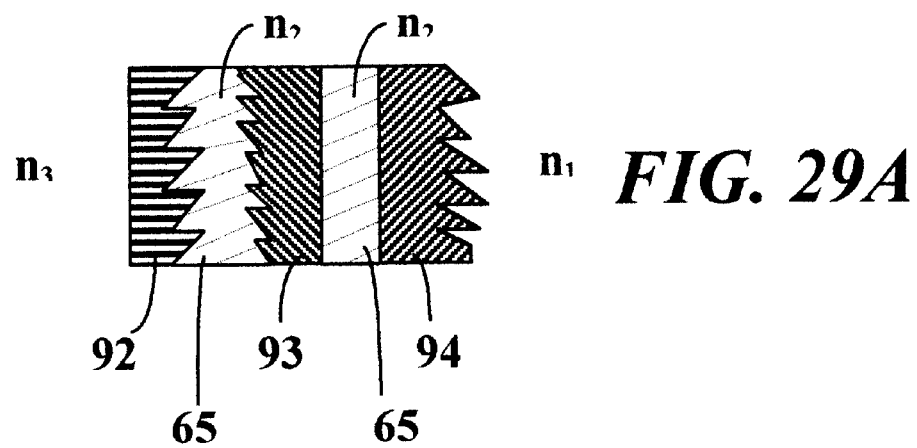
FIG. 29A
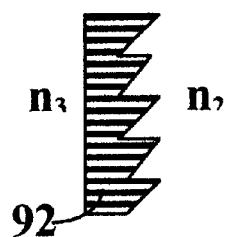 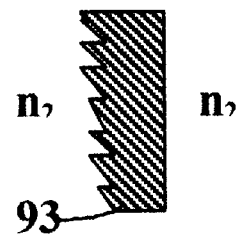 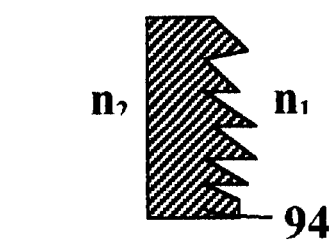
FIG. 29B  FIG. 29C  FIG. 29D
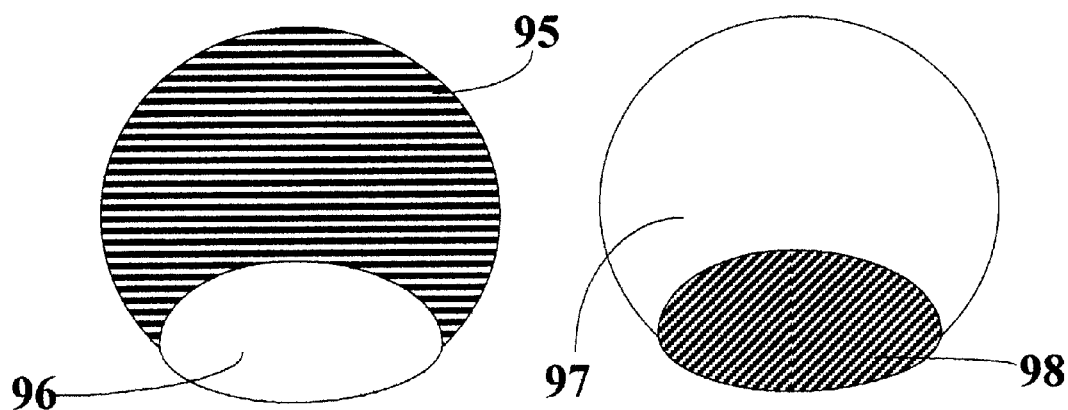
FIG. 30A  FIG. 30B

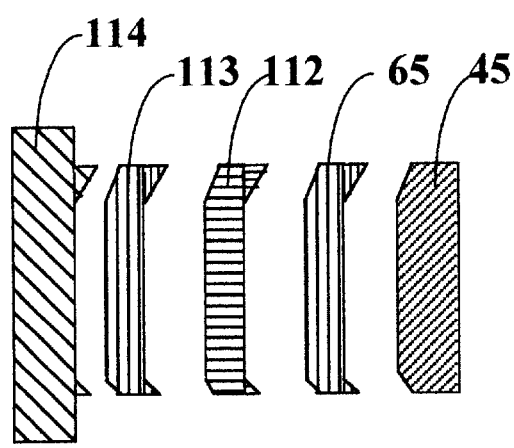
FIG. 32
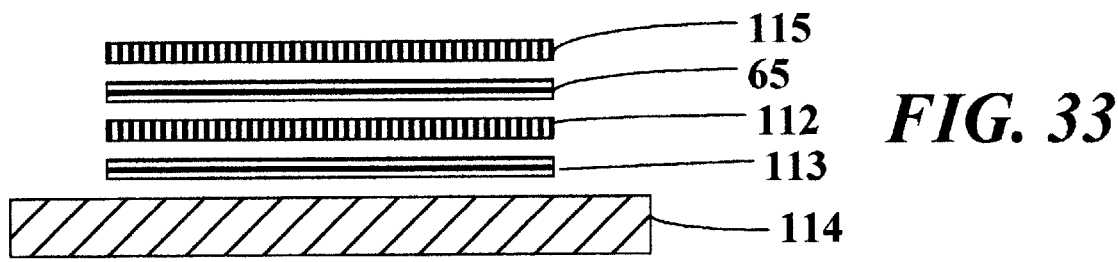
FIG. 33
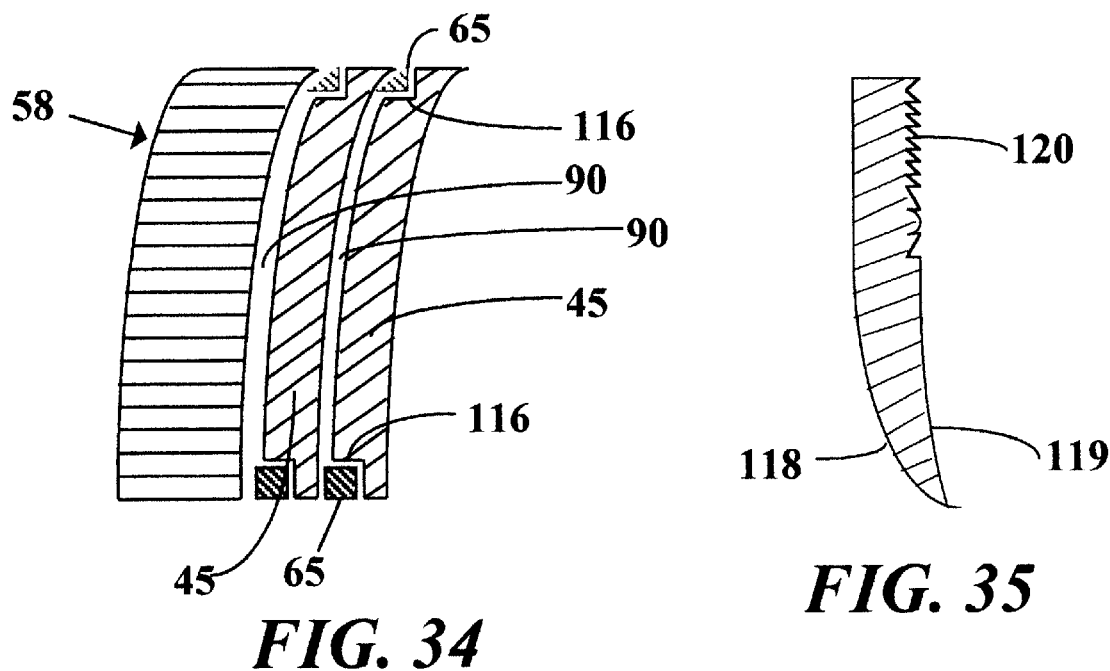
FIG. 34
FIG. 35

OPHTHALMIC LENS SYNTHESIZED FROM ITS SPECIFICATION

This application claims the benefit of U.S. Provisional Application No. 60/056,062 filed Sep. 2, 1997.

BACKGROUND OF THE INVENTION

1. Field of the Invention

This invention relates to a novel prescription lens, mainly suited for ophthalmic applications, which can be formed to almost any shape and any thickness the designer wishes to, and a method which the design is synthesized from its specification.

2. Terms Definition

The term "eyewear" as used herein is defined as any light-transmitting element or elements in front of the eyes.

The term "prescription" as used herein is defined as a specific combination of optical parameters that meets the needs of a particular person in purpose to solve a large variety of treatments and diagnostic problems known to eye specialists, or the required optical function/properties whenever the article is not an ophthalmic lens. The term "diffractive surface" as used herein is defined as an optical surface having all over the surface plurality of edges or apertures or protrusions that are designed and made in accordance with the Interference phenomena. Only whenever the exact spatial locations (in resolution of few wavelengths) of said edges or apertures or protrusions have an indispensable influence on the image quality, the surface is defined as a diffractive surface.

The term "discontinuous surface" as used herein is defined as a surface having plurality of points and/or curves wherein the first derivative is not continuous.

The term "saw-toothed surface" as used herein is defined as a surface having plurality of discontinuities. That surface may looks like a saw-toothed surface and/or having a steps function nature and/or having plurality of grooves or protrusions or saw-teeth and/or may be defined as a surface that contains plurality of points wherein the surface not being continuously differentiable, and herein all these terms are equivalent.

The term "Thieberger-design-lens" as used herein is defined as the novel thin lens of this invention, in purpose to distinguish it from the previous art lenses.

3. Description of the Prior Art

When a well eyesight person wants to use any eyewear, he is limited only by the industry wide availability of eyewear shapes and materials. When a person suffers from visual impairment wants to use any eyewear, not only he is limited by the industry wide availability of eyewear shapes and materials but he is limited also by the industry availability of prescription eyewear, which has limited shapes and materials available.

Until now, a method, having very good results, that converts any unprescription eyewear to a prescription one was not available. As a result, people suffer from visual impairment had to use prescription glasses or a combination of thick prescription lenses and a big eyewear instead of using any eyewear they want. The wish has been expressed to have a very thin and lightweight lens, with very good optical quality, that by adhering to the inside or outside surface of the eyewear, will convert an unprescription eyewear to a prescription one.

Unprescription eyewear designers are free to design their eyewear to any shape and thickness they want, therefore, we have plenty of fashion and/or user-friendly eyewears, such as, but not limited to, sunglasses, goggles, sport glasses, swimming glasses, diving masks, shooting glasses, helmets, gas masks, etc. On the contrary, prescription eyewear designers are seriously limited by the shape and thickness of prescription lenses, therefore, their creativity is restricted and not exploited appropriately.

Until now, a method, having very good results, that enable to form a prescription lens in any shape and almost any thickness the designer wants was not available. As a result, people who suffer from visual impairment have a small amount of shapes to choose from.

The wish has been expressed to have a prescription lens which is very thin, lightweight, not fragile, can have any desired shape, and have very good optical quality. The previous art prescription lenses are rigid and thick. Shaping and cutting those lenses require expensive tools which are not accessible to most of the people. As a result, most of the people don't have unique eyewears. People cannot cut their lenses to the shape they want, fashioners cannot cut the lenses to shapes that will fit to the dress, the haircut, the car. they designed, etceteras, herein after refer to "recreational stuff".

The industry does not consider it practical to prefabricate a stock of lenses having every possible power of each parameter in every possible combination that may be needed. Consequently, a sizable proportion of eyeglass lenses are custom made at the facilities of dispensing opticians or optical laboratories.

Lenses have traditionally been formed as a single integral body of glass or plastic. Grinding or molding such lenses to meet the specifications of a particular prescription requires costly equipment, highly skilled technicians and is time consuming. In addition, the lens is thick and available in very small amount of shapes. It has been found that the fabrication of prescription lenses can be economically accomplished in a more rapid manner with a laminated lens construction in which two or more lens layers/wafers are bonded together with a transparent adhesive.

The laminate construction enables assembly of lenses having any of a large number of different combinations of optical parameters from a relatively small stock of prefabricated lens layers of different configurations. Combinations of the layers can, for instance, provide lenses having any of a large number of different powers as the power of the lens is the summation of the powers of the layers. Cylinder correction for astigmatism can be adjusted by an appropriate rotation of one layer relative to the other prior to bonding of the layers. Bifocal or multifocal layers can be used when called for by the prescription and interlayer of light absorptive, light reflective or polarizing material can easily be provided between the layers.

The fabrication of laminated lenses is subject to certain problems which have not heretofore been adequately addressed and resolved. The final laminated lens is thick. The layers are available in a very limited amount of shapes and are not designed to bond to an eyewear that has surface that is not spherical or toric. In addition, The laminated lenses are usually frailer than regular lenses and elastic laminated lenses are not available.

In 1748, Count Buffon proposed to grind out of a solid piece of glass a lens in steps or concentric zones, in order to reduce the thickness of the lens to a minimum. In 1822, Augustin Fresnel, for whom the Fresnel lens is named, constructed a lens in which the centers of curvature of the different rings receded from the axis according to their distances from the center.

Modem Fresnel lenses consist of a series of concentric prismatic grooves, designed to cooperatively direct incident light rays to a common focus or focuses. This type of lens is thin, lightweight, can be made elastic, shook resistance, almost unbreakable, and can be accurately and cheaply mass-produced using replication techniques. The problem with Modem Fresnel lenses is that they are limited to flat or rotationally symmetric surfaces. As a result, when a designer design an eyewear which contains Fresnel lens, one of his considerations must be the lens shape.

U.S. Pat. Nos. 3,698,854 and 3,904,281, each issued to Jampolsky, disclose a thin, fully conformable, planarly smooth, plastic membrane which applied and made to adhere with finger pressure to a conventional spectacle lens. The step quickly changes one or more optical characteristics of the spectacle lens or provides a change in the light transmission across the field of view. Those patents force a planarly smooth thin Fresnel lens to adhere to any light transmitting element, although the Fresnel lens and the light transmitting element have initially non-matching surfaces. As a result, there were optical imperfections and distortions and aberrations visible to the wearer. The planarly smooth Fresnel lens does not readily adhere to curved surfaces on a permanently basis and was susceptible to trapping bubbles between a base surface and itself.

U.S. Pat. No. 4,950,057 issued to Shirayanagi, disclose progressive multi-focal ophthalmic lens having a front refractive surface and a rear refractive surface one of which is a progressive surface whose refractive power changes continuously with the other being a non-progressive surface. The progressive surface is formed as a Fresnel lens surface composed of microscopic steps so that the macroscopic shape of the progressive surface generally conforms to that of the non-progressive surface.

The shapes of the lenses according to U.S. Pat. No. 4,950,057 are limited to spherical and toric surfaces, as Shirayanagi states in the patent "It is also possible to render the non-progressive surface toric rather than spherical".

The object of U.S. Pat. No. 4,950,057 is to provide a thinner multi-focal ophthalmic lens. Shirayanagi do not disclose how to produce a prescription lens that can have any desired shape and/or synthesis from its specifications, do not disclose laminated lenses, do not disclose elastic lenses, do not disclose lenses which are too thin to provide a desirable degree of impact strength, do not disclose lenses that adhere to an eyewear, do not disclose lenses which can be cut using simple cutting accessories, do not disclose protected lenses, and do not disclose a method that controls on the viewed geometric pattern made by the Fresnel lens.

Another approach to producing thin and lightweight prescription lenses involves the use of diffractive optics. Few of the shortcomings of diffractive optics lenses are that they can imitate only a multi-focal lens. A diffractive lens must be designed for light of a particular wavelength and will work most efficiently for light at that wavelength. Only about 40% of the light incident on the lens is used for near vision with another 40% being used for far vision. The remaining 20% is not used for either near or far vision, but rather is lost to higher orders of diffraction. This represents the best theoretical case and in manufacturing reality even less light is available due to manufacturing difficulties. Difficulty of manufacture represents another shortcoming of diffractive lenses since the diffractive surface must be in tolerance on the order of the wavelength of light.

U.S. Pat. No. 4,210,391 issued to Cohen, disclose multi-focal diffractive zone plate, methods for manufacture it, and methods for protecting the saw-toothed surface. That lens has limited number of different shapes, as Cohen states in the patent "The carrier lens or body of course, is constructed according to the usual principles governing the design of an optical lens with the surfaces S1 and S2 either spherical, sphero-cylindrical, or of any other appropriate lens design."

U.S. Pat. No. 4,960,326 issued to Dauvergne, disclose a lenticular lens for eyewear which is being formed with a curved substrate having a plurality of imprinted miniature lenses. Dauvergne assumes that the user's mind ignores the web-like interface between the lenses when a user peers through a lens complex positioned close to the eye. But the result is poor, as Dauvergne states in the patent "The proposed eyewear is not considered a substitute for prescription lenses, but is an auxiliary item that is preferably tinted and styled to provide an attractive appearance."

Previous attempts to synthesize a lens from its specifications can be seen, for example, in U.S. Pat. Nos. 4,613,217 and 4,676,610 and 4,787,733. The main problem with those patents is that the final prescription lenses are smooth, i.e., no surface jump discontinuities and no discontinuous changes in the surface slope. As a result, those lenses are thick and can have a very limited amount of shapes because of the connection between the macroscopic shape of the optical article to its optical characteristics U.S. Pat. No. 5,299,062 issued to Ogata, disclose a lens consists of a glass lens having an organic corrective layer consisting of a blazed grating of annuli whose angles are formed to correct aberrations in the glass lens. In addition, Ogata disclose a method of manufacturing the lens in which the resin corrective layer is molded to the glass lens. According to that patent, the organic layer is limited to the purpose of correcting the aberrations of the glass lens.

The problem of the connection between the macroscopic shape of the optical article to its optical characteristics strikes mirror designers too. Mirror designers are seriously limited by the shape of the mirror, therefore, their creativity is restricted and not exploited appropriately. For instance, vehicle manufacturers spend huge percents of their development budgets on impressive designs, but concerning to mirrors, all of them are forced to use the same flat mirror.

Prior art unifocal and multifocal Fresnel mirrors are limited to flat or rotationally symmetric surfaces. Prior art mirrors construct of plenty of microscopic spherical lenses suffers from blurred image.

OBJECTS AND SUMMARY OF THE INVENTION

In view of the aforementioned needs and problems in the prior art, it is a primary object of the present invention to provide an optical surface and more specifically a prescription optical surface, such as an optical device and ophthalmic lens. Novel mirrors are also considered a part of this invention. These products are commonly referred to as Thieberger design lenses and mirrors that can have almost any desired shape and thickness. There is almost no connection between the thickness and the macroscopic shape of Thieberger-design-lens to its optical characteristics. Therefore, It is another object of the present invention to provide a method which the design is synthesized from its specification. The design method permits generation of different families of lenses, embodying different selections of other parameters such as zones size and placement, eye path, etc.

Thieberger-design-lens has three main preferred embodiments. An Add-on type Thieberger-design-lens, a Stand-alone type Thieberger-design-lens, and a composition of the former.

Add-on type Thieberger-design-lens is bonded or attached to an eyewear. Its main purpose is to convert an unprescription eyewear to a prescription eyewear or to change one or more optical characteristics of any prescription or unprescription optical element, what ever its kind or use.

It has been discovered that if we want the Add-on type to be very thin, have very good optical qualities and acceptable bond, the lens' surface and the eyewear's surface have to be initially matching. As the Add-on type will initially fit to the eyewear's surface more closely, it will have less aberrations, will be thinner, will bond better and will be less visible to the wearer and observers.

Add-on Thieberger-design-lens by itself may also be too thin to provide a desirable degree of impact strength, thus cannot be used individually.

The Add-on Thieberger-design-lens may cover all the eyewear's lens surface or only a part of it. It may be attached or adhere permanently or impermanently to the front and/or rear surface of the eyewear. It may be used for cost reduction.

The main purpose of the Stand-alone type Thieberger-design-lens is to provide a better alternative to conventional prescription lenses.

It is another object of the present invention to provide a prescription lens which may be very light-weight, elastic (suitable for instance to sport activities, safety glasses, children's glasses, etc.), almost unbreakable, cheaply mass-produced, with large angular viewing range, with high power and very low aberrations, enough thin and soft to enable people to cut and shape their lenses as they wish by using simple cutting accessories such as scissors and the like.

It is another object of the present invention to provide a laminated Thieberger-design-lens made of two or more layers. Light reflective or polarizing material may be provided between the layers. One of the layers can be provided with photochromic characteristics. That laminated lens has all the economic advantages of the previous art laminated lenses and in addition, has all the advantages of Thieberger-design-lens.

Plastic lenses are less fragile, lighter, and more economically mass-manufactured then glass lenses, but are inferior to glass lenses with respect to hardness, scratch resistance, resistance to radiation, ability to receive a wide range of lasting surface treatments (such as anti-reflecting, reflecting, coloration), and photochromic durability.

It is another object of the present invention to provide a high quality laminated composite lens, composed of one or more organic Thieberger-design-layer and a glass layer (that can have any shape of course). This composite lens incorporates all the advantages of organic lenses and all the advantages of glass lenses. In addition, it can have highly impact resistance and highly shatter resistance. The organic layer may also be used for correcting aberrations of the glass layer, such as, for example, chromatic aberration.

Because the photochromic lens or layer (which can be made of glass or plastic) of the present invention can have a uniform thickness, when it is exposed to sunlight it will assume a uniform darkness. That uniform thickness provides a significant optical advantage over conventional photochromic prescription lenses which have varying thickness that caused to non uniform darkness when exposed to sunlight.

Thieberger-design-lens may be combined with conventional stock lenses. Comparing to the known in the art laminated lenses, the result is thinner, lighter, and in some cases less fragile.

It is another object of the present invention to provide a thin, lightweight, and high quality prescription lenses for patients who have suffered cataract, or some retinal or optic nerve damage which results in decreased visual function due to decreased visual acuity, or decreased visual field, or formation of blind spots, or a combination of thereof. This object can be achieved since the prescription lens of the present invention has rough surface, which permit individual calculation of every normal to the prescription lens in such a way that optimal correction can be obtained for each eye viewing angle in the viewing zone, and/or optimal minimization of the residual/peripheral astigmatism/blur can be obtained for each viewing-axis depending on the selected eye model and according to the lens characteristics and profile of use.

Thieberger-design-lens may be partially or entirely tinted to pass or reflect certain wavelengths of light, may be diffused, or blurred uniformly or differentially, may have selective opaque or transmitting areas or a combination thereof, may be coated with polarizing material, may be coated with scratch resistant material, may be coated with holographic recording material as disclosed for example in U.S. Pat. No. 5,432,623, may be marked as disclosed for example in U.S. Pat. No. 4,619,504.

The prescription parameters (such as eye path location, axis, power, cylinder location, and etceteras) may be noted on the lens with impermanently ink or on a non-stick protective covering, etc.

In a preferred embodiment, Thieberger-design-lens is covered with a protective layer which protects against scratches, dust, etc.

It is a further object of the present invention to provide a method that controls on the lens' viewed geometric pattern (caused be the discontinuities of the surface) in purpose to make a more aesthetic and fashioned article, and to enable the designer to optimize to minimum the diffraction aberrations and the image blur and to optimize the manufacturing process.

In order to carry out all the objects of the present invention, the macroscopic surfaces of the Thieberger-design-lens are first defined by the lens' designer. One surface (or both of them) is not smooth but has a microscopic surface that looks like a saw-toothed surface, sometimes refer to as a saw-toothed zone or as a saw-toothed surface zone (each saw-tooth is smooth of course). The design process assumes that the locations of the object, the lens, and the required image are known. By using Ray-tracing technique we calculate the microscopic normals to the lens that will form the required image. The final microscopic surface (which looks like a saw-tooth surface) will be obtained by a continuously summation of the slopes (which are obtained from the previous calculated normals). Before starting to sum the slopes, we set a set of conditions, which will be called herein "Geometric pattern conditions" or predetermine condition/s. Those conditions can be any one or all of the following: condition on H, geometric condition, diffraction consideration, quality of the formed image, cosmetic factors, grinding technique, manufacturing technique, surface durability, tolerance budgeting methods. These conditions, finally, determine the size and height of each saw-tooth, i.e., until when the slope summation process will continue and when there will be a discontinuity and a new slope summation for a new saw-tooth will begin. The Geometric Pattern Conditions can determine directly the size or height of the saw-tooth by using a condition on the shape or on the height, or determine indirectly by using a condition on the diffraction effect or the image quality, i.e. the slope summation process will continue until the diffraction effect will get to a some predetermined value or the image blur be less than a predetermined value.

It is another object of the present invention to provide unifocal and multifocal mirrors which can have any desired shape and can be made flexible.

All the noted previous art problems are solved by the novel prescription lens of the present invention, which can have any desired shape and almost any thickness.

Further objects, features and advantages of the present invention can be more completely understood by reference to the detailed description of preferred embodiments, taken in conjunction with the drawings, and from the appended claims.

BRIEF DESCRIPTION OF THE DRAWINGS

FIG. 16A is a front plan view of the geometry produced by using condition on H.

FIG. 16B is a cross sectional view of FIG. 16A.

FIG. 17A is a front plan view of the geometry produced by using geometric conditions.

FIG. 17B is a cross sectional view of FIG. 17A.

FIG. 18A is a front plan view of the geometry produced by using a combination of both conditions.

FIG. 18B is a cross sectional view of FIG. 18A.

FIGS. 19, 20 shows two possible modifications to the design process.

FIG. 25 is a cross sectional view of a Thieberger-design-mirror.

FIG. 26 is a cross sectional view of a combined Thieberger design lens-mirror system.

FIG. 27 is a cross sectional exploded view shows an adhesive adapter.

FIG. 28A shows another possible adhesive configuration.

FIG. 28B shows the final connected structure of the adhesive and lens of FIG. 28A.

FIG. 29A is a cross sectional view shows a three layers laminated Stand-alone Thieberger-design-lens.

FIGS. 29B–D are cross sectional views show each layer in its appropriate media for the microscopic surface design.

FIGS. 30A, B are front plan views that show a distance vision layer and a close-up vision layer, which are designed to avoid overlapping saw-toothed surfaces zones.

FIG. 32 is a cross sectional exploded view of an Add-on Thieberger-design-lens and adhesives, as provided to the retailer.

FIG. 33 is a cross sectional exploded view of the adhesive in the case where lenses are provided to the retailer as a two pieces kit.

FIG. 34 is a cross sectional exploded view that shows the recesses used for reducing the gap between the layers.

FIG. 35 shows a cross sectional view of a lens consisted of a regular smooth "classical" prism shape part and a saw-toothed surface part.

DETAILED DESCRIPTION OF PREFERRED EMBODIMENTS

Contents

Figure 1:
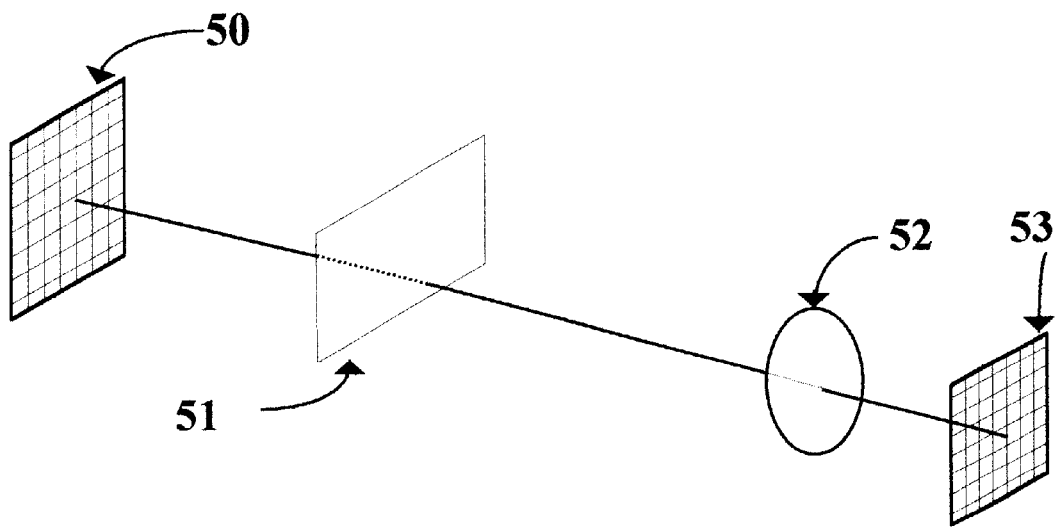
FIG. 1 is a schematic representation of the setup assumed in the design process of the present invention.

1. The design process of Stand-alone Thieberger-design-lens
2. The design process of add-on Thieberger-design-lens
3. The geometric pattern conditions
4. Protected Thieberger-design-lens
5. Thieberger-design-mirror
6. Methods for cost reduction
7. Laminated Thieberger-design-lens
8. Additional preferred embodiments
9. Manufacturing and materials 1. The Design Process of Stand-alone Thieberger-design-lens Step #1: The design process assumes that the object and its corresponding image (which is a function of the prescription lens characteristics) are known, thus, before start synthesize Thieberger-design-lens we have to calculate, by ordinary Ray-tracing, the image derived from the object accordingly to the prescription lens characteristics (such as power, cylinder, prismatic, etc.). This calculation is repeated (only once) for each prescription that we intend to use.

FIG. 1 is a schematic representation of the setup assumed in the design process, which consist of: Object plane 50, lens plane 51, Ideal camera lens 52 at the aperture stop of the system and an Image plane 53. The three dimensional locations of the system's parts depend on lens power and eye path location.

Figure 2:
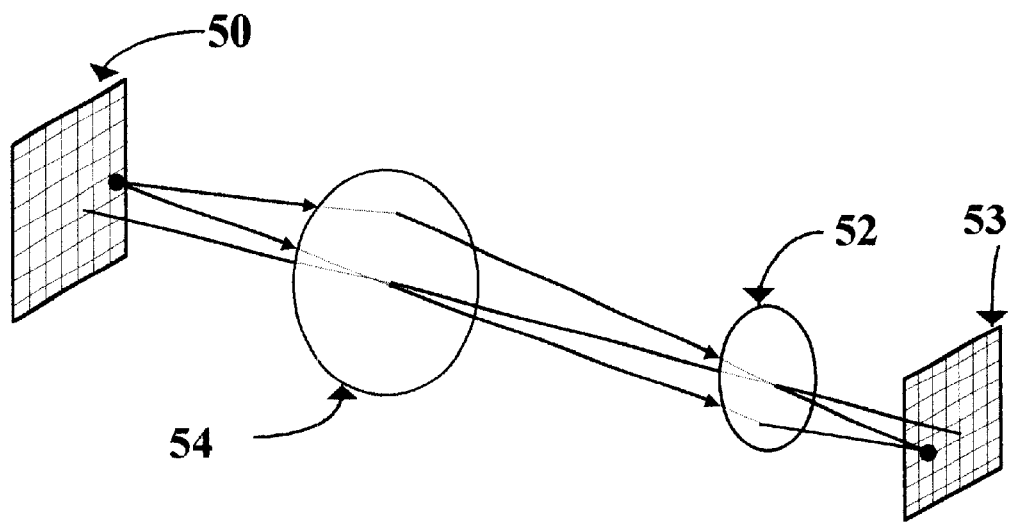
FIG. 2 is a schematic representation of the image calculation.

FIG. 2 is a schematic representation of the image calculation. The prescription lens 54 is placed in the lens plane 51. The object 50 and the camera lens 52 are placed accordingly to the lens' power. Two rays from an object point, one through the center of the prescription lens 54 and one through the center of the camera lens 52, define the corresponding image point.

Figure 3:
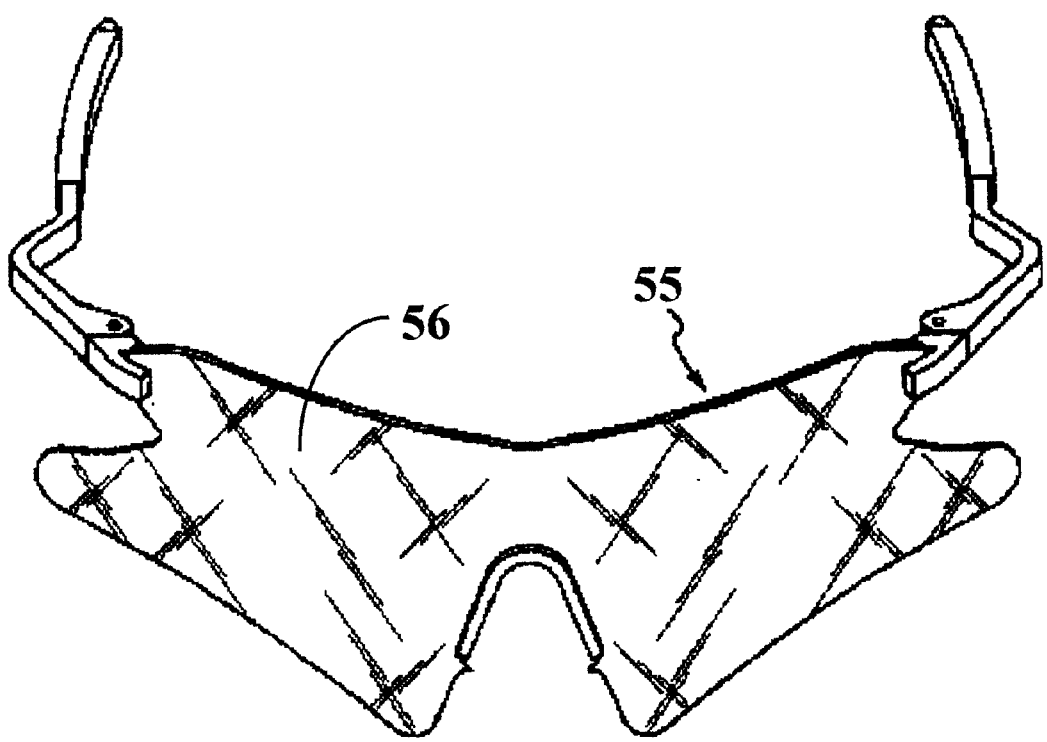
FIGS. 3 and 4 are front plan views of an eyewear which was designed without prescription considerations.
Figure 4:
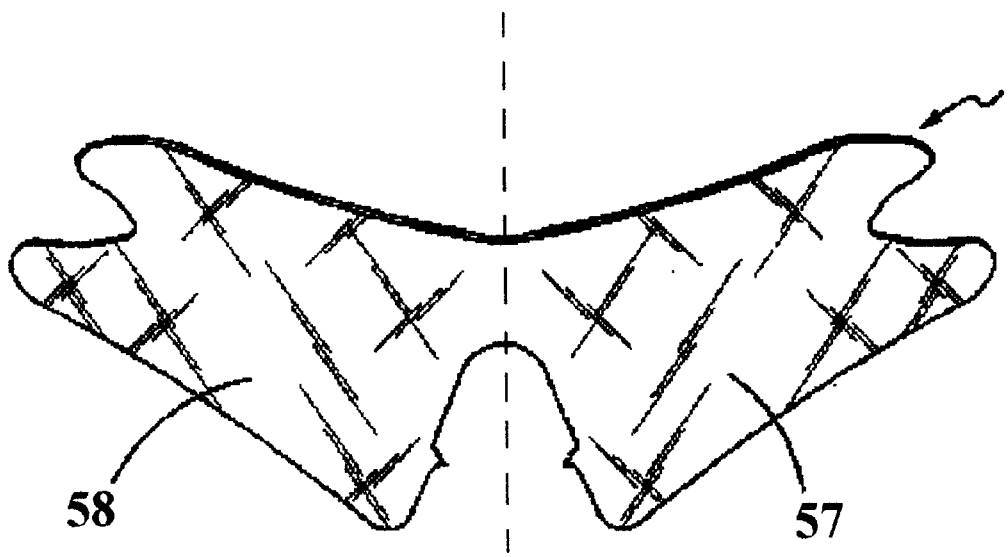

Step #2: The designer designs an eyewear with any desirable shape and thickness. He may do it without prescription considerations. FIG. 3 is an example for an eyewear 55 which was designed without prescription considerations. The eyewear contains one portion lens 56 so we will split it to right region 57 and left region 58 which can be seen in FIG. 4. From here we will refer to only one region (58), the other (57) is synthesize similarly.

Figure 5:
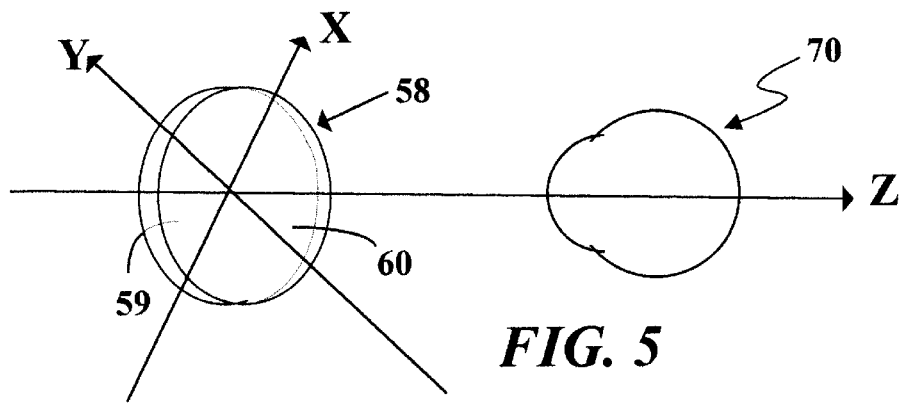
FIG. 5 shows the axis system used in the design process.

Step #3: Find the global coordinates matrixes that specify the surfaces 59 and 60 that make up the eyewear's lens 58, when the Z axis coincides with the main eye-path (the eye-path through the main vision portion) as shown in FIG. 5. Those matrixes can be obtained by any known method. For instance, if the lens has a known shape, its surface coordinates can be calculated numerically. If there is a prototype, it can be scanned by a XYZ machine, etc.

Step #4: What kind of prescription is desired ?. For instance, unifocal, multifocal, progressive, etceteras. Where to place every viewing zone ?. For instance, far viewing zone at the upper portion of the lens and close-up viewing zone at the bottom portion of the lens. Divide the eyewear lens to equal-power zones. Progressive varying power zones will be divided to discrete equal-power zones.

Step #5: LENS SETUP procedure. Referring to FIG. 1, Place the eyewear's lens 58 at the lens plane 51. Choose an equal-power zone. According to the required eye path and the required power of that equal-power zone, place the object 50, place the camera lens 52, and place the image 53.

Step #6: CALCULATION OF THE NORMALS TO SURFACE. The locations of the object points, the locations of corresponding image points, and the location of the camera lens are known. The macroscopic shape of the eyewear lens is known (58). By using Ray-tracing technique we can find the required microscopic normals to one of the surfaces while the other is smooth (i.e. the microscopic surface can be derived from the macroscopic surface, see FIG. 6), or find condition on the microscopic normals to the surfaces in case where both surfaces have microscopic saw-toothed surface as shown in FIG. 7. FIG. 8 shows schematically a simplification that can be made. Of the many rays that can be traced for each point of the object, one ray uniquely defines the required microscopic normal to the surface. It is the ray that passes through the center of the aperture stop places in the plane of the camera lens $(x_C, y_C, z_C)$, known as the chief ray. 62 and 61 are the tangents to the surfaces in the intersection points. Snell's law states: $n'(S \times r') = n(S \times r)$ where $r = (\alpha, \beta, \gamma)$ is the ray unit vector. $S = (L, M, N)$ is the normal to the surface. n is the refraction index.

Figure 8:
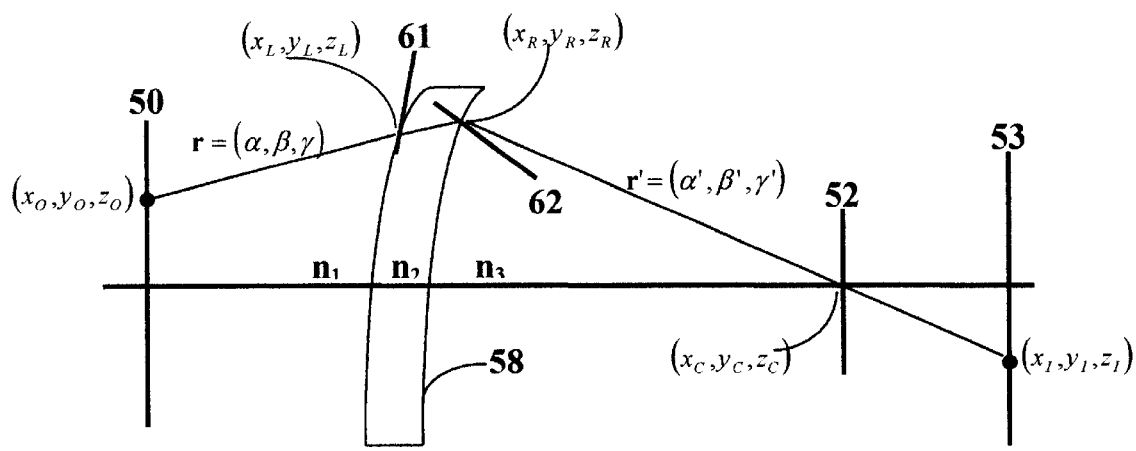
FIG. 8 is a schematically representation of tracing the chief-ray.
Figure 9:
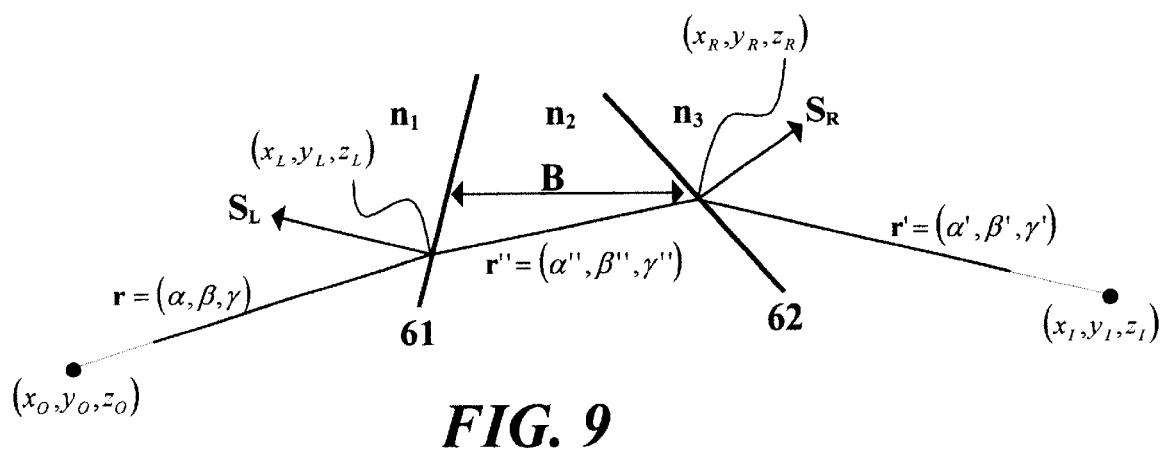
FIG. 9 is an enlarge view of FIG. 8.

Referring to FIG. 8, $r' = (\alpha', \beta', \gamma')$ derived from points $(x_I, y_I, z_I)$ and $(x_C, y_C, z_C)$. Point $(x_R, y_R, z_R)$ is the intersection point between the vector defined by points $(x_C, y_C, z_C)$ and $(x_C, y_C, z_C)$ to the rear surface of the eyewear lens which is specified by the surface's coordinate matrix. Referring to FIG. 9, in the case where the front surface is smooth, $r = (\alpha, \beta, \gamma)$ can be obtain with few iterations consist of: guess $x_L, y_L, z_L$), calculate $r = (\alpha, \beta, \gamma)$, calculate r' $n_1(S_L \times r) = n_2(S_L \times r'')$, is the intersection point of r'' with the rear surface is $(x_R, y_R, z_R)$?. The normal to the rear surface $S_R$ is obtained by solving Snell's law for $S_R$ $n_3(S_R \times r') = n_2(S_R \times r'')$. The case where the rear surface is smooth and the front surface has microscopic saw-toothed surface is solved similarly. In the case where both surfaces have microscopic saw-toothed surfaces, we have a degree of freedom when choosing $S_R$ and $S_L$.

Step #7: The computation so far has given us the necessary normal to surface at the intersection point, or conditions for the normals in the case where both of the surfaces have microscopic saw-toothed surface. Repeat step 6 for all chief-rays from image that intersects the eyewear surface in the current equal-power zone.

Step #8: Repeat steps 5–7 for all equal-power zones. We ended up with a matrix of normals to surface, or two matrixes of conditions on the normals in the case where both of the surfaces have microscopic saw-toothed surface. Those surface normals, which define the curvature and the curvature directions, will be converted into surface heights at step 9.

It is important to trace sufficient number of rays through the eyewear's lens. Usually, few hundreds to few thousands rays to square centimeter are adequate. The number mostly depended on the eyewear's surface complexity and the desired prescription. Interpolation may be used to increase density where needed.

Figure 10:
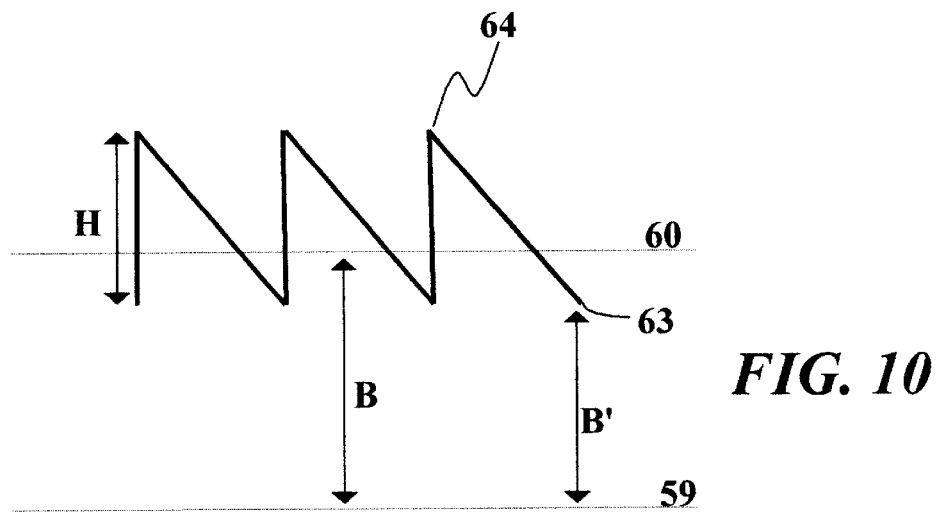
FIG. 10 is a cross sectional view which shows the lens thickness and the saw-tooth height.

Referring to FIG. 10, surfaces 59 and 60 are defined by the designer and specified in the surface coordinates matrixes. B is the initial thickness of the lens at point (x,y) and is calculate by $Z_{60}(x,y) - Z_{59}(x,y)$ where $Z_{60}(X,y)$ is the Z coordinate of point (x,y) in surface 60 and $Z_{59}(x,y)$ is the Z coordinate of point (x,y) in surface 59. 63 is the base point of the saw-tooth. 64 is the highest point of the saw-tooth. H is the maximum height of the saw tooth and is calculated by $Z_{64} - Z_{63}$. B'(which will be called herein "the base") is calculated by $Z_{63}(x,y) - Z_{59}(x,y)$. As B' increase, the lens' thickness and impact resistance increases.

Step #9: Obtaining the surface from the calculated normals, with geometric pattern condition considerations.

The foregoing computation produced a matrix of normals to surface. A projection plan on XY plane is assigned to each normal. The surface is obtained from those normals by a process of summation the slopes with boundary continuity considerations and geometric pattern condition considerations. Each normal S(L,M,N) defines a plan $L(X-x)+M(Y-y)+N(Z-z)$. The boundary of the plane is defined by the midpoints between neighboring planes as shown in FIG. 11 or is the average of two midpoints when there are two neighboring matrix points as shown in FIG. 12.

The surface heights are obtained from the surface slopes by a process of summation. The summation begins from the base point 63 of the saw-tooth, which is defined by the designer, and continues until a geometric pattern condition is fulfilled.

Figure 11:
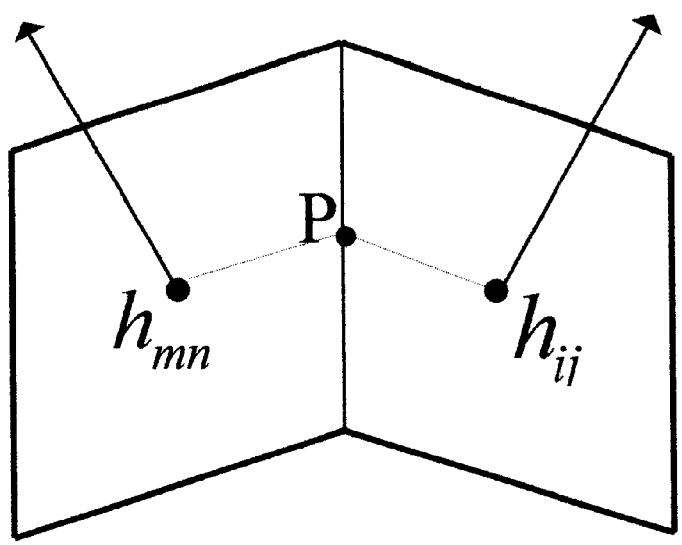
FIG. 11 shows the boundary continuity consideration definition with one neighboring plane.
Figure 12:
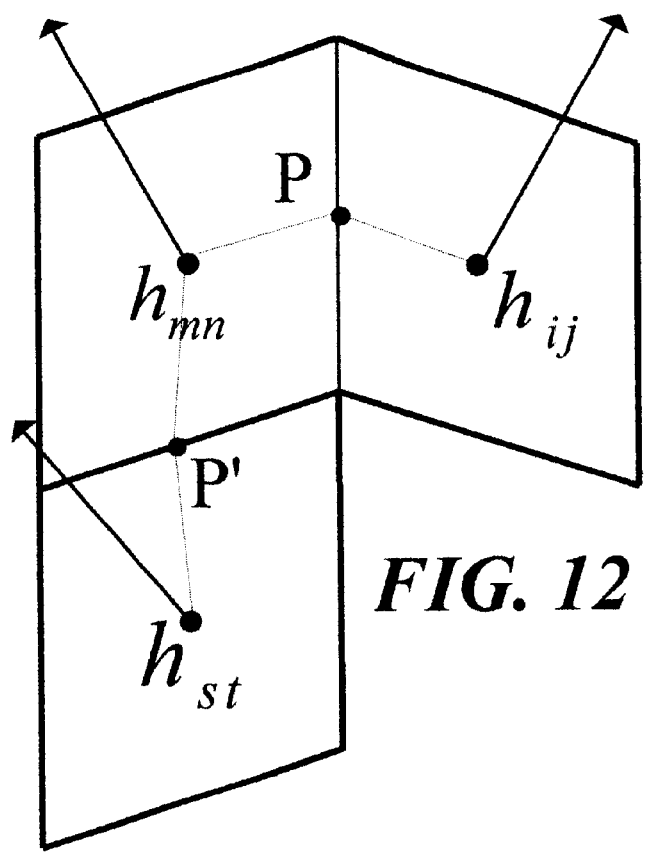
FIG. 12 shows the boundary continuity consideration definition with two neighboring planes.

Referring to FIG. 11, consider two neighboring planes at matrix points (i,j) and (n,m). The height at point (i,j) is known from a previous calculation and therefore its Cartesian coordinates are known. Point P is the midpoint between the two matrix points and is given by:

$$P_x = (x_{ij} + x_{nm})/2$$

$$P_y = (y_{ij} + y_{nm})/2$$

Using these values for point at (i,j) in the equation for a plane we find the Z coordinate for the point at P as, $$P_z = Z_{ij} - [L_{ij}(P_x - X_{ij}) + M_{ij}(P_y - Y_{ij})]/N_{ij}$$

Where $Z_{ij}$ is the height of the previous point. Using the equation of a plane for the plane containing the unknown height we obtain, $$Z_{mn} = P_z + [L_{mn}(P_x - X_{mn}) + M_{mn}(P_y - Y_{mn})]/N_{mn}$$

After each height calculation, check whether the geometric pattern condition is fulfilled. If it is, begin a new summation for a new saw-tooth from a new base point.

What is left is to continue these calculations for the next neighboring points according to the geometric pattern conditions until all the surface heights are calculated.

Figure 13A:
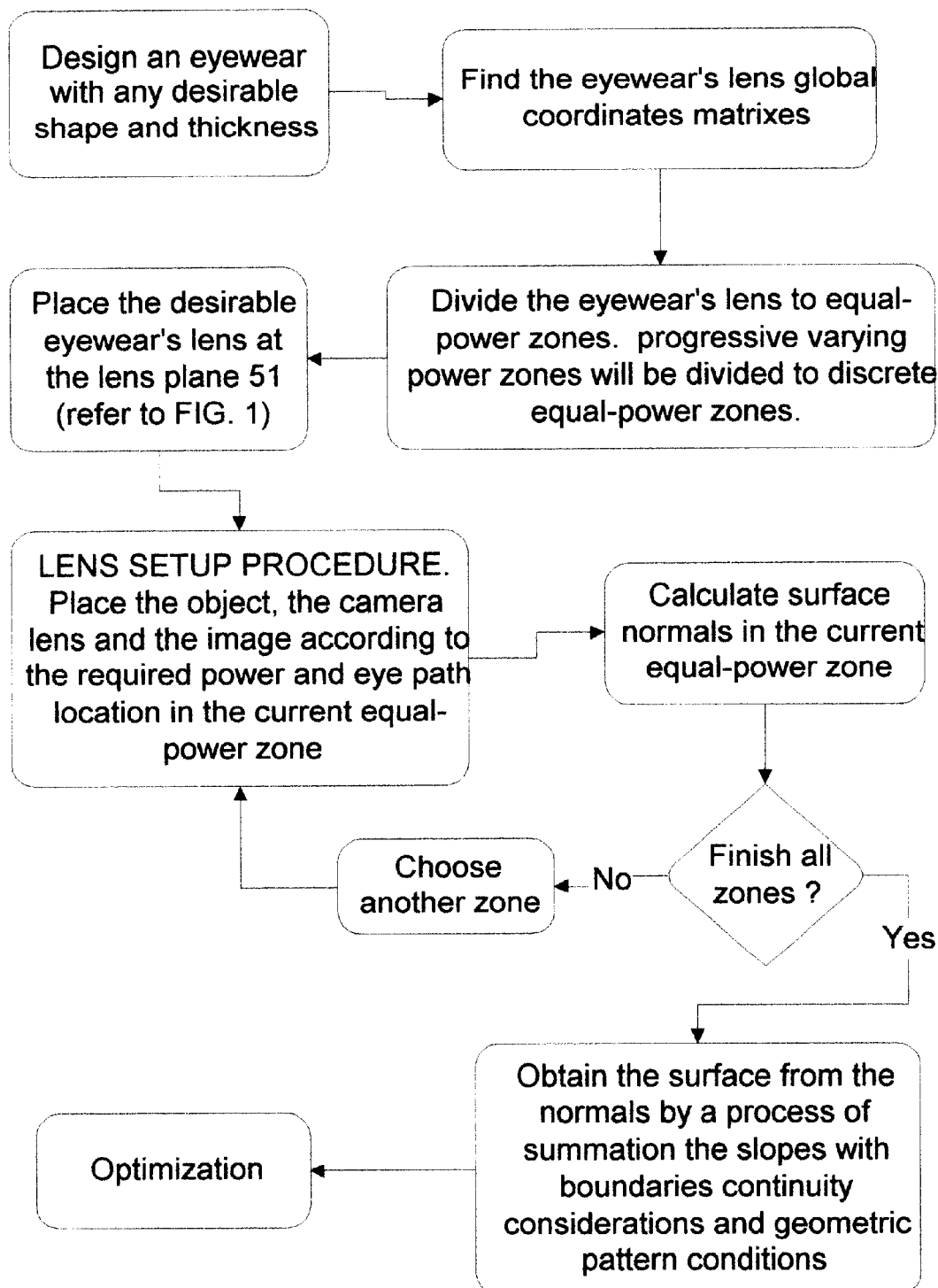
FIG. 13A is a flow-chart that summarize the design process of a Stand-alone type Thieberger-design-lens.

FIG. 13A is a flow-chart that summarizes the design process of a Stand-alone type Thieberger-design-lens. Since the height of each saw-tooth is a function of only Z, this embodiment has the additional advantage of reducing the load on the control of machining operations. There are cases (for instance, eyewear with large angular viewing range) where the manufacturer may consider a design that allows changing the parameters of the height function according to changes of the eye-pass. In that case, the height of each saw-tooth will not be a function of only Z The design can be optimized by exact Ray-tracing that will take in account the height changes caused by the normals summation process. Another optimization possibility is to use a more accurate image or eye-model.

When the saw-toothed surface is very dense, a diffractive optimization, made by the Geometric Pattern Conditions, can be made in purpose to reduce the diffractive aberrations. This is done by changing the distances between the saw-teeth in such a way that will minimize the destructive diffraction effect.

2. The Design Process of add-on Thieberger-design-lens

The purpose of Add-on type Thieberger-design-lens is to convert unprescription eyewear to prescription eyewear, or to change one or more optical characteristics of a prescription eyewear. As the surfaces of Thieberger-design-lens will be fitted to the eyewear more accurately, there will be less aberrations.

Figure 14:
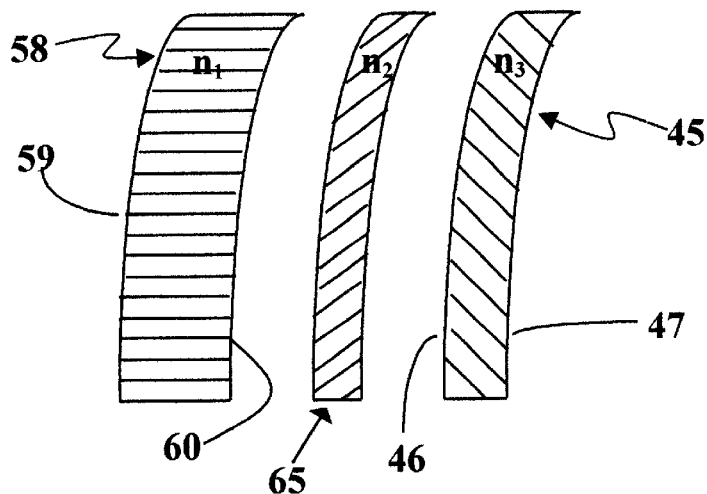
FIG. 14 is a cross sectional exploded view of an Add-on type Thieberger-design-lens, adhesive, and eyewear.

FIG. 14 shows an exploded view of an Add-on type Thieberger-design-lens 45 that is bonded to an eyewear 58 by a thin layer of uniform thickness adhesive 65. Surface 46 (of Thieberger-design-lens) is very similar to surface 60 (of the eyewear). In the general case where the adhesive has varying thickness, surface 46 is the summation of surface 60 coordinate matrix and the thickness of the adhesive at each point.

Figure 15:
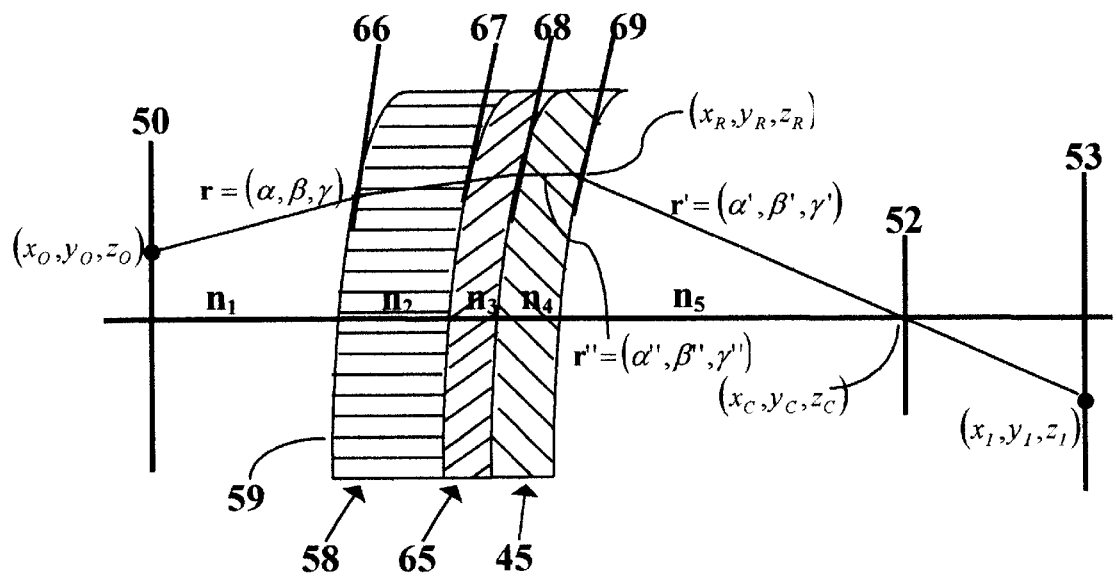
FIG. 15 is a schematically representation of tracing the chief-ray through Add-on type.

The design process of add-on type Thieberger-design-lens is similar to the design process of Stand-alone type, and goes as follows:

Step #1: As Stand-alone type.
Step #2: Referring to FIG. 14, surface 46 is matching to the eyewear's surface 60. Surface 47 is defined by the designer.
Steps #3–4: As Stand-alone type.
Step #5: LENS SETUP procedure. Referring to FIG. 1, Place the eyewear lens 58 and the adhesive 65 and the Add-on lens 45 at the lens plane 51 as shown in FIG. 15.

Choose an equal-power zone and according to the required eye path and the required power of that equal-power zone, place the object, the camera lens and the image.
Step #6: Referring to FIG. 15, $r'=(\alpha',\beta',\gamma')$ derived from points $(x_I,y_I,z_I)$ and $(x_C,y_C,z_C)$ 66, 67, 68 and 69 are the tangents to the surfaces at the intersection points. Point $(x_R,y_R,z_R)$ is the intersection point between the vector defined by points $(x_I,y_I,z_I)$ and $(x_C,y_C,z_C)$ to the rear surface of the Add-on lens which is specified by the surface's coordinate matrix. Tangents 66, 67, and 68 are known. r" can be obtain by few iterations consist of: 1. guess $r=(\alpha,\beta,\gamma)$, calculate all the intersection points using Snell's low. 2. is the intersection point of r" with the rear surface is $(x_R,y_R,z_R)$?.

The normal to the rear surface $S_R$ is obtained by solving Snell's law for $S_R$ $n_5(S_R \times r')=n_4(S_R \times r")$.
Steps #7–9: As Stand-alone type.

Figure 13B:
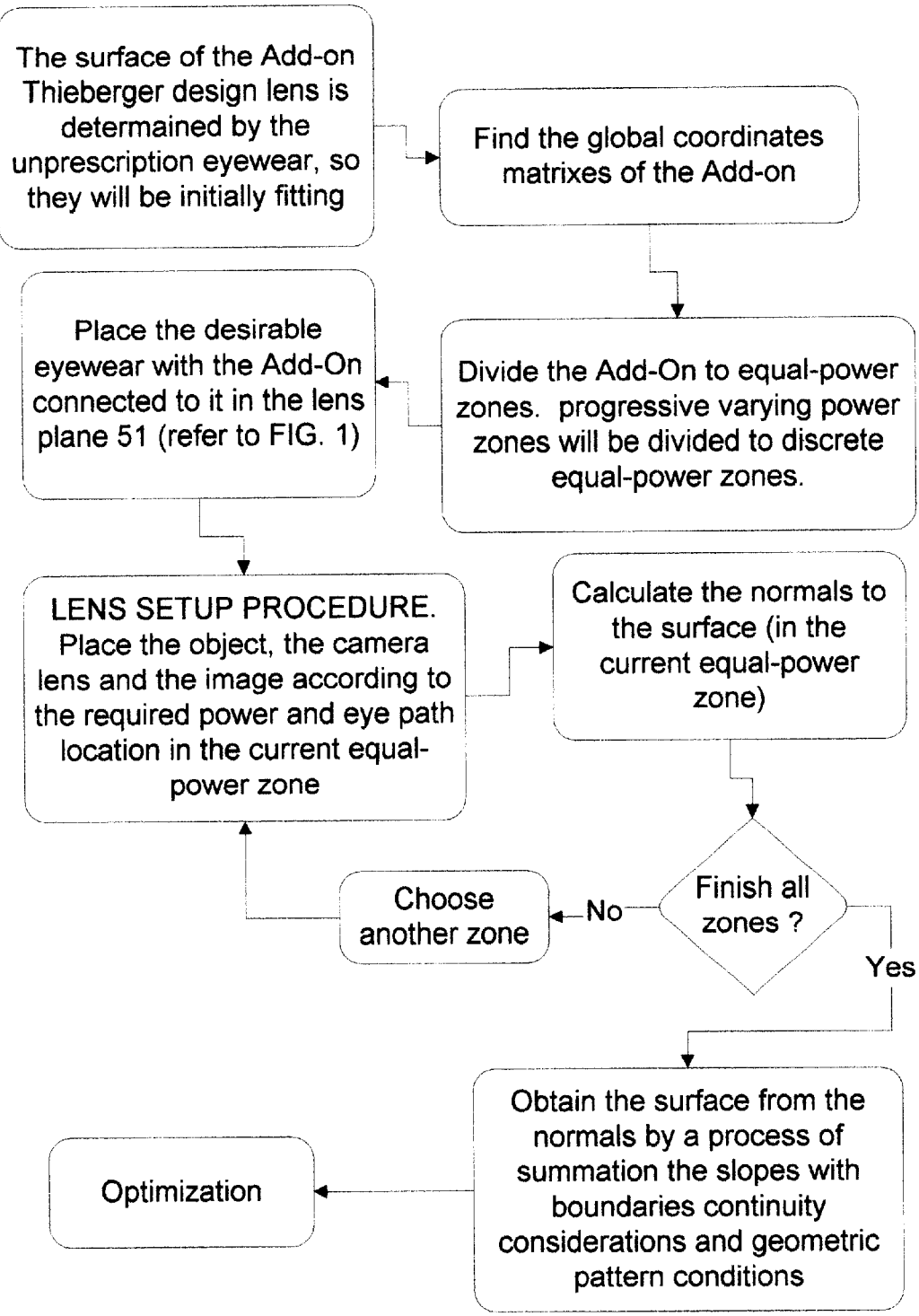
FIG. 13B is a flow-chart that summarizes the design process of an Add-on type Thieberger-design-lens.

FIG. 13B is a flow-chart that summarizes the design process of an Add-on type Thieberger-design-lens.

3. The Geometric Pattern Conditions

Figure 6:
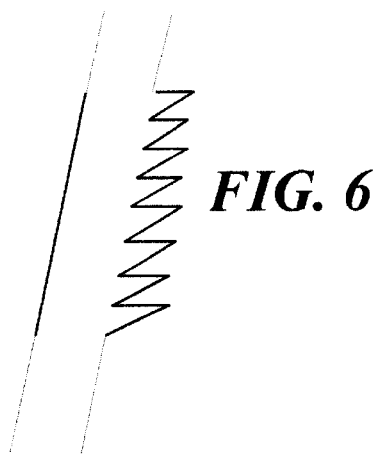
FIG. 6 is a cross sectional view of Thieberger-design-lens with one saw-toothed surface and the other smooth.
Figure 7:
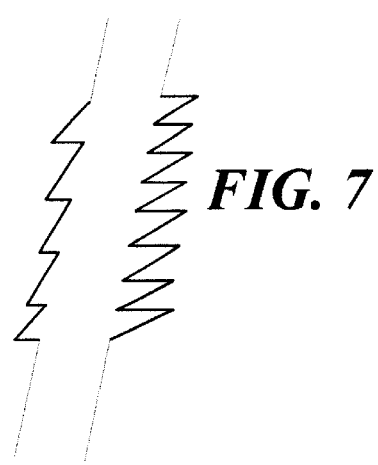
FIG. 7 is a cross sectional view of Thieberger-design-lens where both surfaces are saw-toothed.

Thieberger-design-lens has at least one surface which is looks like a saw-toothed surface as shown in FIGS. 6 and 7. Referring to FIG. 10, as H is smaller, the lens can be made thinner, but the density of the saw-teeth increase and as a result, the diffraction aberrations increase, and vice versa. The geometric pattern conditions determine how the discontinuity lines will look like, by using any appropriate considerations. The preferred embodiment of geometric pattern conditions can be divided to three main groups:

1. Condition on H.
2. Geometric condition.
3. Combination of the previous conditions. Condition on H (refer to FIG. 10) is the maximum height permitted to each saw-tooth. The slopes summation process will proceed until the condition [H>maximum_permitted_high] is true. Then will be a discontinuity and a new summation process for a new saw-tooth will begin from a new base point 63 (which is defined by the designer). When the condition on H is constant, the lens maintains a generally uniform thickness over the entire surface. The disadvantage of this condition is that the viewed geometric pattern of the lens (when H is big enough to be visible) can be not aesthetic. FIG. 16A shows an example of the viewed geometry of condition on H. FIG. 16B is a cross section view of FIG. 16A.

Geometric condition is the technique that cures the aesthetic problem of condition on H. In that condition, the summation process continues until a predefined border. The predefined border is determined by the designer, thus the designer can control on the geometric pattern of the discontinuities. The disadvantage of this condition is that there is no control on the saw-teeth height. FIG. 17A shows an example of the viewed geometry of geometric condition. FIG. 17B is a cross section view of FIG. 17A.

The preferred Geometric pattern condition embodiment is a combination of condition on H and geometric condition. By a combination of those conditions we can control on the viewed geometric pattern, and at the same time control on the maximum height of the saw-teeth. FIG. 18A shows an example of a combination of both conditions. FIG. 18B is a cross section view of FIG. 18A.

Combination of condition on H and geometric condition can be a very powerful tool that enables the designer to "draw" almost any shape on the lens.

It is to be understood that the above described process is just an illustrate of the principle process. There are however, innumerable modifications and changes which may be devised by those skill in the art which may embody the principles of the process and fall within the spirit and scope thereof. The following examples demonstrate possible modifications.

EXAMPLE #1

Design process of distance viewing Add-on Thieberger-design-lens.

FIG. 19 is a cross section view of a possible system. 58 is the eyewear. 65 is the adhesive and 45 is the Thieberger-design-lens. Z axis coincident with the eye-pass. F is the focal point. 47 is the saw-toothed surface. All the rays from an object at infinite assumed to be parallel to Z axis. The normals $N_1$, , $N_2$, $N_3$ to each point on the surfaces are known.

Step #1: $N_1$, $N_2$, $N_3$ and rare known. r" and the intersection point $(x_R,y_R,z_R)$ can be calculated by using Snell's low. From $(X_R,y_R,z_R)$ and F we derive r'. $N_4$ is obtained from $(N_4 \times r')=n_3(N_4 \times r")$.

Step #2: Repeat step #1 until the density of the calculated normals is sufficient.

Step #3: Obtain the surface from the normals by a process of summation the slopes with geometric pattern conditions.

EXAMPLE #2

Figure 20:
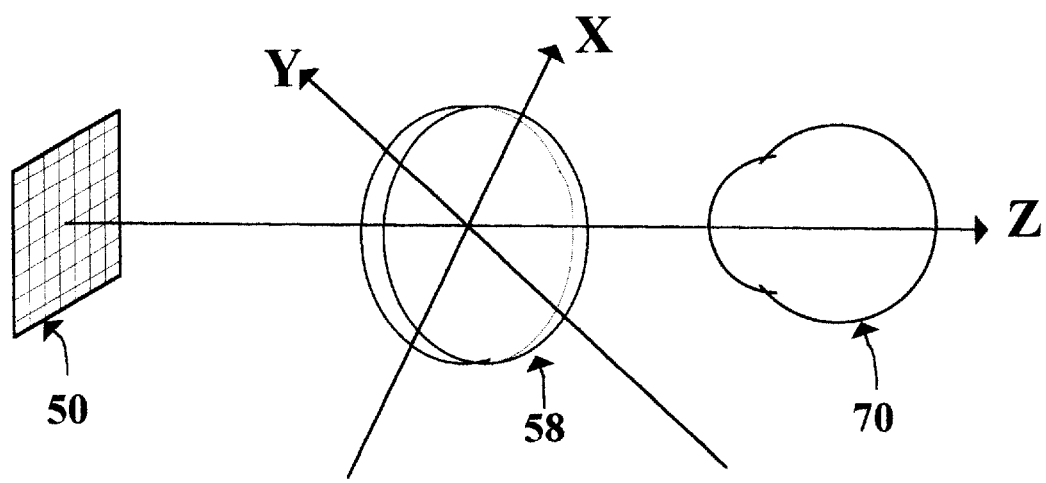

The normals to the surface can be calculated by using one of the well know in the art models of astigmatic human eye. Referring to FIG. 20, the locations of all the system parts (i.e., the object 50, the corrective eyewear lens 58, and model of the astigmatic eye 70) are known. The desired image (of the object) on the retina is known from the eye model. The defocus blur image formed by the astigmatic eye (without corrective lens 58) on the retina is known from the eye model. By using Ray-tracing technique, and taking in account the movements of the eye, we can calculate the required microscopic normals of the corrective lens 58 so that the astigmatic effect of the corrective lens optimally cancels the astigmatic effect of the eye, and by that, the desired image will be formed on the retina.

The distances of the object from the eye determine the corrective lens type. For unifocal lens, the object distance is the same over the entire field of view. For multifocal and progressive lenses, the object distances and orientations depend on the viewing zone and the viewing direction of the eye.

EXAMPLE #3

There are many more possibilities to solve the well know mathematics problem of obtaining a surface from its normals (step #9). For example, each saw-tooth can be calculated by using iterative algorithms of high order polynomials with continuous partial derivatives at the boundaries (between the normals). Each saw-tooth can be smoothed through spline analysis or technique in such a manner, etceteras.

EXAMPLE #4

The decision when to begin a new summation of the slopes for getting a new saw-tooth may depend on the image quality by using iterative algorithm. The discontinuities will be chosen in such a way that the image blur, or any other image quality criterion, will be reduce to the minimum possible and by that produce the best available image quality for the pre-selected macroscopic shape of the lens. Surface durability and tolerance budgeting methods may be used the same way.

4. Protected Thieberger-design-lens

Figure 21:
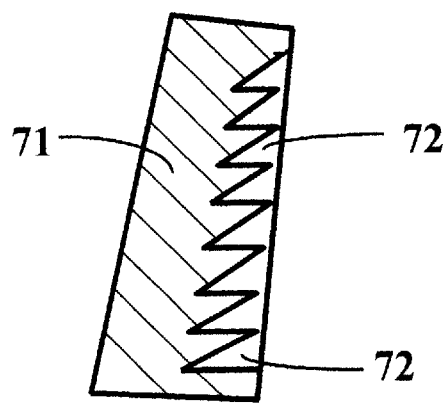
FIG. 21 is a cross sectional view of a protected Thieberger-design-lens.

When we wish to avoid a saw-toothed surface or to protect the facets from dirt or damage, we may consider a number of possible modifications as shown in FIGS. 21–24 wherein the saw-toothed surface is protected by protective means. Referring to FIG. 21, Thieberger-design-lens 71 has its saw-toothed surface imbedded in an optical media 72, which has a different index of refraction than Thieberger-design-lens 71, and can be made smooth. That embodiment can be made, for example, by filling the saw-toothed surface with a material having a different refraction index or by ion-implantation techniques. In the case of laminated or Add-on type with one saw-toothed surface and the other smooth, the saw-toothed surface can be placed in the inner side (of the composite lens) and then the protecting material 72 will be the adhesive.

Figure 22:
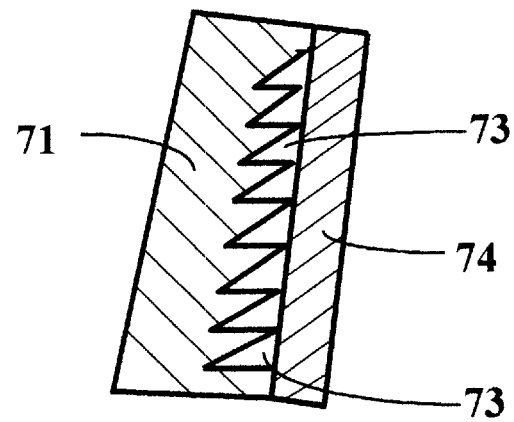
FIGS. 22–23 are cross sectional views of partially hollow protected Thieberger-design-lenses.

FIG. 22 shows a partially hollow protected Thieberger-design-lens that is made from a lens 71 and a protective layer 74. Spaces 73 containing vacuum or filled with captive gas or liquid that has a different refraction index than 71 and 74. 74 can also be the eyewear in the case of Add-on type Thieberger-design-lens.

Figure 23:
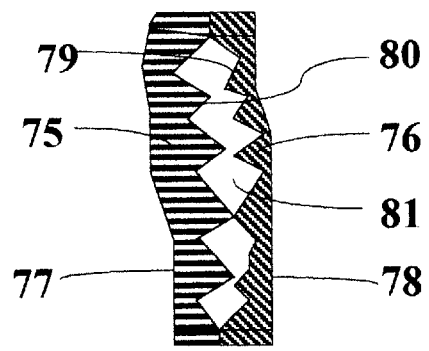
Figure 24:
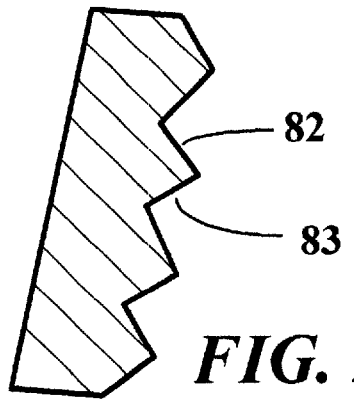
FIG. 24 is a cross sectional view of a protected multifocal Thieberger-design-lens.

FIG. 23 shows a partially hollow protected Thieberger-design-lens which is made of a front lens 75 and a back lens 76. Surfaces 77 and 78 are defined by the designer. 79 and 80 are the saw-toothed surfaces. Space 81 is filled with captive gas, vacuum, liquid, or any other appropriate material that have a different refraction index than lenses 75 and 76. It is known in the art that under certain circumstances, the brain can discriminate separate competing images by accepting the in-focus image and rejecting the out of focus image. Thus, a lens containing at least one near correction focal and one far correction focal can be constructed from a plurality of zones which vary from far vision correction 82 to near vision correction 83, then back to far correction, and again to back, or vice versa. FIG. 24 shows the result lens which is not smooth, but has less sharp facets (the discontinuity is reduced). That construction can be obtained by using condition on H. Each time the condition is fulfilled, we begin to sum up a new saw-tooth but of other focal length and from the same height.

In a case where we want to keep the various image brightness at each of the focal points substantially equal in intensity, or with constant ratio, we have to divide the zones with appropriate ratio (by using geometric conditions). Usually, this division will be expressed in sharpener facets and more discontinuities (but still it will be more continuous than a unifocal lens).

5. Thieberger-design-mirror

The design process of Thieberger-design-mirror is similar to the design process of Thieberger-design-lens. Every Thieberger-design-lens embodiment has its analog Thieberger-design-mirror embodiment. For purposes herein the Thieberger-design-lens, optical surfaces, prescription optical surfaces are refer to, terms are meant to include the Thieberger-design-mirror embodiment. FIG. 25 shows a Thieberger-design-mirror. The mirror body 84 is made with a reflecting surface 85. The reflective surface can be replaced by Retroreflectors (the angles are so that total internal reflection occurs) which enable the mirror to be elastic and not fragile. FIG. 26 shows a combined Thieberger design lens-mirror system. 86 is the lens, 87 is the mirror.

6. Methods for Cost Reduction

The industry does not consider it to be practical and economic to produce a unique set of Add-on Thieberger-design-lenses to each eyewear. Disclosed six preferred methods for adapting/converting between surfaces which are not initially matching. Method #7 reduce the number of molds needed to be made when producing molded multifocal Thieberger-design-lens.

FIG. 14 is an exploded view of an Add-on type Thieberger-design-lens. For simple and consist explanation, assume that:

1. Surface 46 is smooth and surface 47 has saw-teeth.
2. Surface 46 is not initially matching to surface 60 but is similar.

It has been found that a little distortion to the saw-toothed surface 47 (caused by the fact that surface 46 is not initially matching to surface 60) cause more aberrations than a little distortion to surface 46 (the smooth surface). The following 3 methods take advantage of that fact.

Method #1: Referring to FIG. 27, adhesive 65 is used as an adapter between the Thieberger-design-lens to the eyewear. The adapter's purpose is to prevent distortions to surface 47. The adapter is made of adhesive that has varying thickness. Surface 88 initially matching surface 60, surface 89 initially matching surface 46. The adapter may have the same refraction index as that of Thieberger-design-lens.

Method #2: The adapter of Method #1 can be made of flexible adhesive, or adhesive and a thin, not fragile, polymer which has equal or nearly equal refraction index as the adhesive. In this case, surfaces 88 and 89 do not have to be initially matching.

Method #3: When Thieberger-design-lens is made by molding, casting, stamping or pressing processes, the mold used to fabricate surface 47 is much more expensive then the mold used to fabricate surface 46. According to method #3, the mold of surface 46 (the smooth) will be replaced to a mold that suit surface 60. The mold of surface 47 will stay the same.

Method #4: Thieberger-design-lens can be made flexible enough to conform to an eyewear with similar but not nearly equal surface. Practically, this method weakens the demand for initially matching surfaces. As the lens power and the surface differences will increase, the aberrations will increase.

Method #5: The adhesive 65 may cover only selected parts of the lens, as shown for instance in FIGS. 28A–B. This method has two main advantages: 1. The flow zone, or zones, 91 (the zones that are not bonded) don't have to be initially matching. 2. The laminating process is simplified because air is separating between the lenses.

Method #6: When the former methods are not sufficient, we can make a special converting layer which will be called herein "the universal converter". The universal converter can adapt between any Add-on Thieberger-design-lens to any eyewear surface. The macroscopic shape of the universal converter is designed such that one of the surfaces is initially matching to the eyewear, and the other surface is initially matching to the Add-on Thieberger-design-lens. The microscopic structure of the universal converter is designed such that it will imitate the original eyewear which the Add-on was designed to, and cancel the aberrations caused by the non-matching eyewear and the converter. The universal converter is a very power tool because it enable us to convert, with only one converting layer, a whole kit of Add-on Thieberger-design-lenses which is adapted to a specific eyewear, to be adapted to another eyewear and/or different pupil location.

Method #7: Modem computer controlled cutting machines are accurate enough to enable the assembly of a mold from plurality of interchangeable mold-segments. The term "mold" as used herein is defined as a mold used in making Thieberger-design-lens, or a mold used to make another mold that ultimately used in making Thieberger-design-lens. Thieberger-design-lens enable the designer to defined the macroscopic surface of the lens, therefor, the molds used in making Thieberger-design-lens can be assembled from a plurality of different power and eye-pass mold-segments, that are bonded and designed to fit together. This method is especially useful when producing two or more different Thieberger-design-lenses, which have one or more segments with the same surface curvature, or when producing multifocal or progressive Thieberger-design-lens. For instance, the mold used to manufacture a multifocal can be made from a distance vision mold-segment and a close-up vision mold-segment. When the molding process is finish, the mold-segments may be separated for later reuse in another configuration.

When the surface of one lens entirely contains the surface of a second lens, it is usually more economical to manufacture only the first lens, and when needed, cut from it the second lens, instead of dividing the mold of the first lens to two or more parts.

7. Laminated Thieberger-design-lens

Laminate lenses are usually built from a front layer and a rear layer, or from a main front layer and one or more small rear layers, or from plurality of different size and thickness layers.

The preferred design process of laminated Thieberger-design-lens is similar to the preferred design process of Thieberger-design-lens, and goes as follows:

Step #1: How many layers to use ?, How to bond the layers ?, Protected or not protected Thieberger-design-layers?

Step #2: What is the desired correction of each layer?

Step #3: Design the macroscopic shapes.

Step #4: Calculate the layers' microscopic surface (similarly to the calculation of Thieberger-design-lens).

EXAMPLE

FIG. 29A shows a laminated Stand-alone Thieberger-design-lens, made of three layers 92–94. When the adhesive 65 is thin, the calculation of each layer is very simple. Each layer can be think of as a Stand alone Thieberger-design-lens in media which is determined by the layer's boundary media. FIGS. 29B–D shows the layers in their appropriate media. In this manner, we can design a laminated Thieberger-design-lens containing as many layers as we want. It is obvious that all the previous cost reduction methods can be used when manufacturing laminated Thieberger-design-lens.

All the well known in the art combinations of classical layers (for instance, front layer for distance vision and rear layer for close-up, vocational, etc.) and all the well known in the art laminated lenses types (for instance, multifocal, progressive, special vocation, etc.) can be done with Thieberger-design-layers. A polarizing layer, or thin filters such as ultraviolet blocking films may be provided between successive layers. Light reflective, or special delicate multilayer interference coatings can be provided on the outside surface, or preferably, provided on one or more of the inside surfaces so that these coatings are protected by the adhesive and by the layers.

Because of the high cost of the molds used in manufacturing Thieberger-design-lenses, sometime it is economic to manufacture unifocal laminated Thieberger-design-lenses too. For instance, assume we want to make Thieberger-design-lens in the range of −12 to +12 diopters with 0.25 diopter intervals. Instead of 12×2×4+1=97 different Thieberger-design-lenses, we can make 12×2+1=25 front layers for all the integer numbers and four rear layers that add 0 or +0.25 or +0.5 or +0.75 when bonded to the front layer. In addition, we can add for example a third cylinder correction layer.

The diffractive aberrations increase with every layer added, therefor when possible, it's recommended to prevent unnecessary overlapping zones of saw-toothed surfaces. For instance, FIG. 30A shows a distance vision layer, FIG. 30B shows the close-up vision layer. 95 and 98 are the saw-toothed zones. 96 and 97 are smooth zones. When the layers are bonded together in purpose to obtain a bifocal, there won't be overlapping saw-toothed surfaces zones, so the diffractive aberrations won't increase.

Due to the wide disparity in the thermal expansion of glass with respect to plastic, composite lens, comprised a glass layer (that can have any desired shape of course) and one or more plastic Thieberger-design-layers, may suffer from problems such as delamination, incomplete bonding, stress-induced birefringence, and high sensitivity to temperature changes. In cases where the well known in the art plastic-glass adhesives and bonding techniques can not solve those problems, those problems can be solved by using elastomer adhesives such as those used in U.S. Pat. Nos. 4,679,918 and 4,793,703.

Another possible technique of forming the aforesaid composite glass-plastic lens, comprising the steps of:
1. Placing an uncured resin into a mold having a cavity formed in the shape of the desired saw-toothed surface.
2. Inserting the glass layer into the mold so that a surface of the glass layer contacts the uncured resin. 3. Exposing the lens and resin to agent causing the resin to cure. 4. Removing the cured composite lens from the mold. Similar technique to that used herein is fully described in U.S. Pat. No. 5,299,062 issued to Ogata.

The Preferred Lamination Procedure

The eyewear retailer is supplied with a kit of Thieberger-design-layers, each of them having particular correction/s and a type identification number. In addition, the eyewear retailer is supplied with tables, which are divided according to the lenses' shape and prescription (including location) and the distance between the lens to the eye.

According to the required shape and prescription, the retailer searches in the tables for the type identification numbers and laminating order of the layers he has to laminate. The axis, center, and orientation may be noted (by nonpermanent means) on each layer. Prior to laminating it is important to clean the surfaces which will be bonded.

Figure 31:
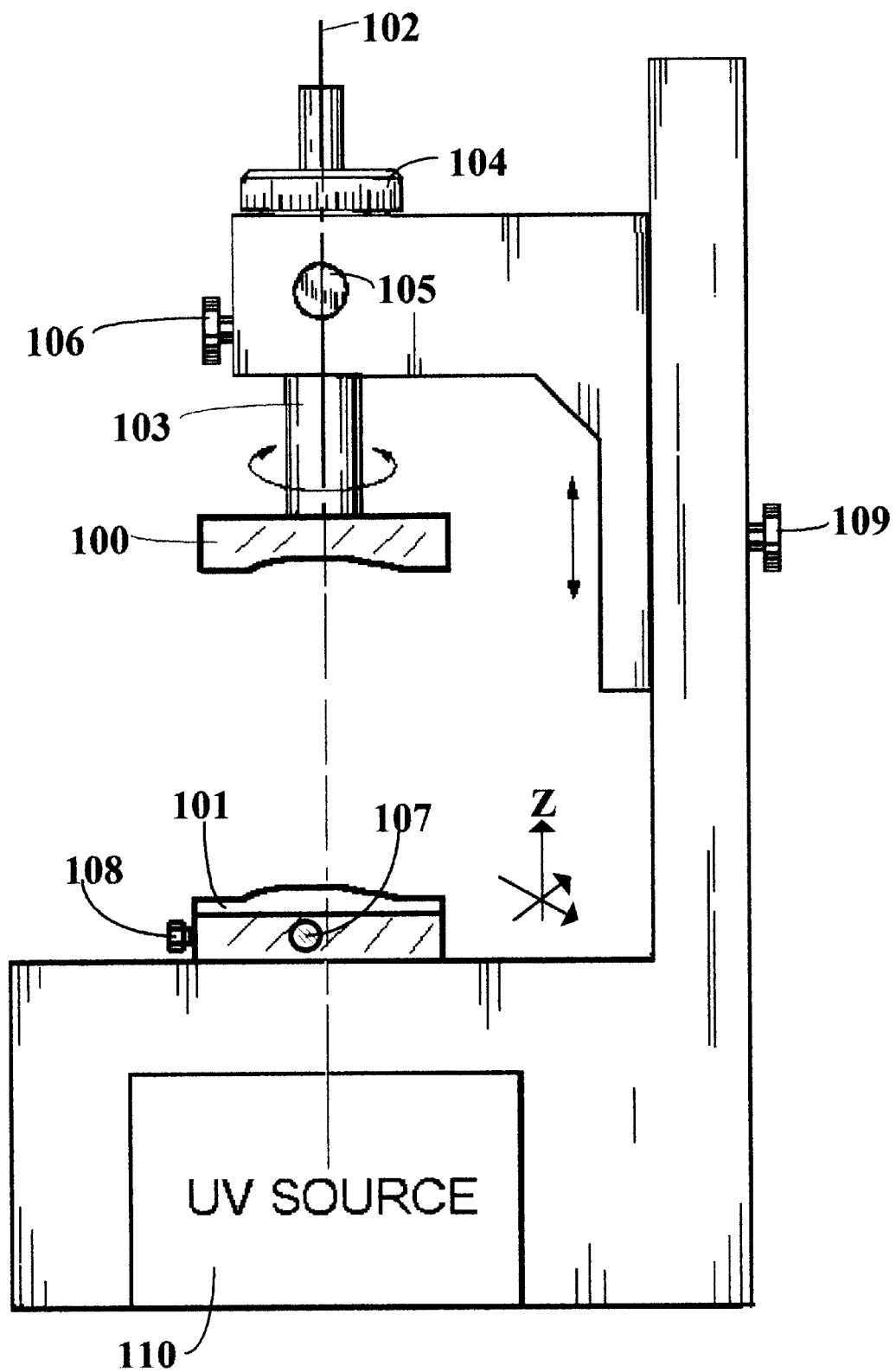
FIG. 31 shows a bonding system for more accurate and controlled bonding process.

The layers can be bonded together by using tiny pincers and finger pressure, or when more accurate and controlled process is desired, the layers can be bonded together by a bonding system such as FIG. 31. Referring to FIG. 31, holders 100 and 101, called hereinafter "lens-holders", hold the front and rear layers (or the eyewear and the Add-on Thieberger-design-lens, etc.). The layer may be connected to the lens-holder by vacuum, or temporary adhesive, or clamp, or any other means. The lens-holders are removable and each layer should have its own adapted lens-holder. Holder 100 moves along the laminating axis 102 to press the rear layer against the front layer. The pressure dispersal is determined by the lens-holders 100 and 101. When uniform pressure is required, the lens-holders will be the layer's negative (i.e., initially matching). When accurate control on the pressure is required, 103 can be replaced with a springs system that measure the force.

The positioning of each layer is determined by the lens-holders. Accurate modifications at the (X,Y) plane can be done with screws 104 and 105 and 106. Accurate modifications at the (Z, X) and (Z, Y) planes can be done with screws 107 and 108. Movements along the laminating axis 102 are controlled by screw 109. For UV adhesives we can add an UV source 110 that cure the adhesive while the layers are pressed together.

U.S. Pat. No. 4,892,403 issued to Merle, disclose a method of making a composite plastic lens from a "classical" anterior lens and posterior lens. According to that method, heating the lenses prior to bonding them together, cause a distorted composite lens to return to its original shape and curvature. That method can be applied to Thieberger-design-lenses manufacturing process too in the case when there are distortions, without the limitation of only two lenses.

Laminated flat, spherical, or toric Fresnel lenses can be made the same way.

8. Additional Preferred Embodiments

Referring to FIG. 32, Thieberger-design-lens 45 is backed with a clear, permanent adhesive 65. The adhesive can be protected until use by a clear, non-stick protective covering 112 such as polytetrafluoroethene (Teflon). The non-stick covering may have an extended tab for handling and may itself being backed with a nonpermanent contact cement 113 that holds it temporarily to a carrying surface 114. The carrying surface 114 used to hold Thieberger-design-lens during storage and marketing and note its parameters. The nonpermanent contact cement 113 can also be used to hold temporarily the lens in place on the eyewear in purpose to persuade the customer to buy the eyewear by demonstrating the actual article.

The Add-on Thieberger-design-lens may be provided to the retailer as a two pieces kit containing: lens 45, and adhesive as shown in FIG. 33. 115 is a protective covering such as polytetrafluoroethene. The permanent adhesive 65 may be of a composition which allows the lens to be removed from the eyewear with a solvent.

In an alternate embodiment, Thieberger-design-lens does not cover all the eyewear's surface but only a part of it. In that case, The contact cement 113 can also being used to determine the optimally position it is to be placed permanently, and there may be a note, pointing the central axis.

In an alternate embodiment, the permanent adhesive 65 does not cover all the lens' surface, but only a part (preferably the edge) or parts of it. FIG. 28A is an exploded view of a narrow adhesive connector that covers only the edge as seen in FIG. 28B. In the middle, there is a gap 90 contains gas or liquid. In purpose to reduce the gap 90 between the lenses, Thieberger-design-lens may have recesses 116 for the adhesive, as shown in FIG. 34. The gap 90 between the eyewear 58 to Thieberger-design-lens 45 and between the Thieberger-design-lenses is reduced due to the recesses 116. This embodiment simplifies the design process and simplifies the assembly of laminated lenses (which are calculated as the calculation used for attached ideal thin "classical" lenses).

In another preferred embodiment, the saw-toothed surface/s cover/s only one or more parts of the lens. The smooth parts may be made like regular smooth "classical" lenses. FIG. 35 demonstrate a lens build up of a classical positive lens part which has smooth surfaces 118 and 119 (prism shape), and a saw-toothed part 120.

In another preferred embodiment, Thieberger-design-lenses are enough soft and thin to enable people to cut and shape their lenses as they wish, with simple cutting accessories such as scissors and the like. Those lenses are formed of a not fragile organic material. The lenses may be marked or covered with a non-stick covering that notes the lens parameters such as eye-pass, different vision zones, axis, etc. FIGS. 36 A–D shows the preferred using procedure.

Figure 36A:
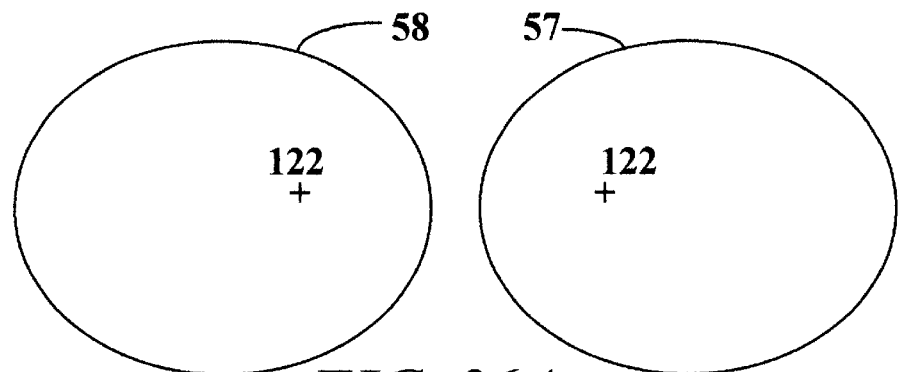
FIGS. 36 A–D show the preferred using procedure for the cutable Thieberger-design-lenses.

Step #1: The customer chooses a frame and lenses. Referring to FIG. 36A, the optician selects the appropriate Thieberger-design-lenses (57, 58). The '+' sign 122 indicates the main axis.

Figure 36B:
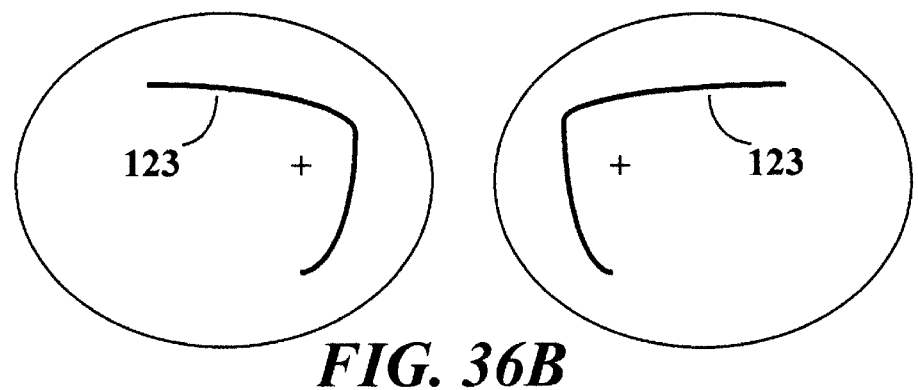

Step #2: Referring to FIG. 36B, according to the desired frame and the pupils distance and location, the retailer draws a line 123, lines, or dots (depending on the frame type). Those lines or dots, notes where the lens has to be connected to the frame, and because of that the customer is forced the cut the lens according to them.

Figure 36C:
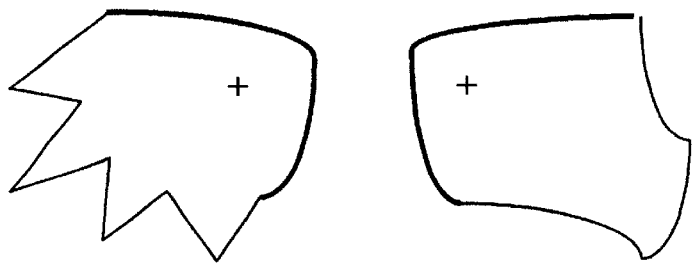
Figure 36D:
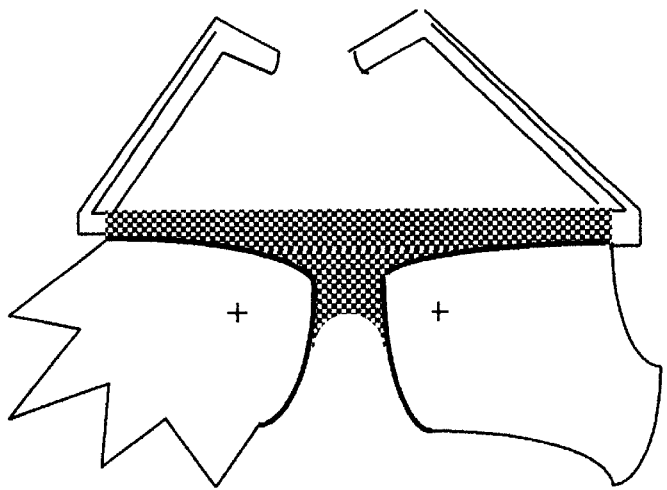

Step #3: Referring to FIG. 36C, The customer cuts the lenses to any shape he wants. The only limitations are the edges 123, which were drawn by the retailer and indicate where the lens has to be connected to the frame.

Step #4: Connect the lenses to the frame, see FIG. 36D.

9. Manufacturing and Materials

Most of the well known in the art manufacturing processes appropriate for manufacturing Fresnel type lenses and/or diffractive Fresnel type lenses and/or light splitters, are suitable for manufacturing Thieberger-design-lenses. The decision when to use a specific method is mainly depended on the desired shape, characteristics, saw-teeth height, material and number of required units. Usually the preferred fabrication technique for plastic Thieberger-design-lens is Compression molding or injection molding.

It is envisioned that there are many accurate numerically controlled machines can be adapted to make the Thieberger-design-lens simply by installing appropriate software or by converting the surface heights to a format from which the machine can read from.

Most of the well known in the art materials appropriate for manufacturing Fresnel type lenses are suitable for manufacturing Thieberger-design-lenses. Thus, when we want to make elastic, or shook resistant, or rigid, etceteras, Thieberger-design-lens, we may use the well known in the art materials used for produce a similar Fresnel type lens with similar characteristics.

When Thieberger-design-lens is made of plastic, attention to mold design, finish, maintenance, and. close process controls is essential. In addition, the shrinkage of the plastic must carefully be accounted for in the mold design.

All the adhesives used in this application are well known in the adhesives and cements art.

Although the invention has been shown in terms of preferred embodiments, it will be apparent to those of skill in the art that numerous modifications and variations and adaptations of the present invention to various usages and conditions may be made without departing from the true spirit and scope thereof, as set forth in the accompanying claims. Thus, For example, instead of the coordination matrixes, the lens can be represented by high-order polynomials. In addition to adhesive, Thieberger-design-lens can be connected to an eyewear by any mechanism such as vacuum, clip-on mechanism, brackets, pressure, thin wires, or any other "lens holders" which capture it to the eyewear.

Although the present invention has been described primarily in terms of ophthalmic applications, it should be understand that the invention is not limited, but encompasses a wide variety of optical lens applications which can be made lighter, thinner, in new shapes which were not possible in the past, with less aberrations, with improved optical characteristics, multifocal instead unifocal, progressive instead of unifocal or multifocal, etc. For example, infrared devices, lenses for cameras, projectors, telescopes, field-glasses, and the like optical devices can be made in accordance with the present invention with the same benefits described for eyewear applications.

Numerous combinations of preferred embodiments and/or their modifications may be made without departing from the true spirit and scope. The terms, expression, and processes which have been employed in this application are used herein as terms of description and not of limitation, and thus there is no intention, in the use of such terms, expression, and processes, of excluding equivalents of the features shown and described, or portions thereof, it being recognized that the scope of the invention is defined and limited only by the following claims.

I claim:

1. A method of making a prescription optical lens, comprising an optical surface zone having a plurality of discontinuities, comprising the steps of:
   a) defining a macroscopic shape for said surface,
   b) calculating microscopic normals to said marcoscopic shape, whereby said microscopic normals produce the required prescription,
   c) calculating the surface heights of said optical surface from said calculated microscopic normals by a process of continuous summation of the slopes that are defined by said microscopic normals to said optical surface,
   d) checking whether a predetermined condition for having a surface discontinuity is fulfilled,
   e) repeating the process when said predetermined condition is fulfilled,
   Wherein the distances between consequent discontinuities are sufficiently large that said optical surface zone can not be considered as a diffractive surface.

2. The method of claim 1, wherein said predetermined condition for having a surface discontinuity is an algorithm comprising the height of said discontinuity.

3. The method of claim 1, wherein said predetermined condition for having a surface discontinuity is an algorithm comprising the microscopic shape of the surface.

4. The method of claim 1, wherein said predetermined condition for having a surface discontinuity is an algorithm comprising the viewed geometric pattern made by said discontinuities.

5. The method of claim 1, wherein said predetermined condition for having a surface discontinuity is an algorithm comprising a diffraction consideration.

6. The method of claim 1, wherein said predetermined condition for having a surface discontinuity is an algorithm comprising a quality of the formed image consideration.

7. The method of claim 1, wherein said predetermined condition for having a surface discontinuity is an algorithm comprising cosmetic factors.

8. The method of claim 1, wherein said predetermined condition for having a surface discontinuity is an algorithm comprising grinding technique consideration.

9. The method of claim 1, wherein said predetermined condition for having a surface discontinuity is an algorithm comprising manufacturing technique.

10. The method of claim 1, wherein said predetermined condition for having a surface discontinuity is an algorithm comprising surface durability consideration.

11. The method of claim 1, wherein said predetermined condition for having a surface discontinuity is an algorithm comprising tolerance budgeting methods.

12. The method of claim 1, wherein the calculation of said microscopic normals to said optical surface comprises:
   a) determining an object and its corresponding image in accordance with the required prescription,
   b) calculating the required microscopic normals to said optical surface by using ray tracing and by using said object and said image as known quantities.

13. The method of making a prescription optical surface according to claim 1, wherein said plurality of discontinuities are protected by protective means.

14. The method of making an optical lens according to claim 1, wherein said optical leans is an ophthalmic lens.

15. The method of making the ophthalmic lens of claim 14, further comprising making a second optical surface zone, said second optical surface zone being a smooth ophthalmic prescription lens.

16. The method of making a prescription optical surface according to claim 1, comprising the further step of utilizing a numerically controlled machining operation, which uses said calculated surface heights, for manufacturing said optical surface zone.

17. The method of making a prescription optical surface according to claim 1, comprising the further step of utilizing a numerically controlled machining operation, which uses said calculated surface heights with the required changes, for manufacturing a mold used in making said optical surface zone.

18. The method of claim 17, wherein said mold is assembled from a plurality of diffferent power and eye-pass mold-segments, that are bonded and made to fit together, wherein said mold-segments may be separated and reused with the same segments or with other appropriate segments.

19. The method of making an optical lens according to claim 1, wherein said optical lens is formed of a not fragile organic material that is sufficiently thin and soft to enable cutting by a simple cutting lens.

20. The method of making the optical lens of claim 1, wherein said optical lens is an ophthalmic lens and said ophthalmic lens having marking means for noting information selected from the group consisting of prescription parameters and notes where said ophthalmic lens has to be connected to an eyewear frame and recreational stuff.

21. The method of making a prescription optical lens according to claim 1, wherein said optical surface is made of a first material and said prescription optical lens further comprising a second material.

22. The method of claim 21, wherein the combination of said first and second materials correct aberrations of said prescription optical lens.

23. The method of claim 21, wherein said first material comprises an optical resin and said second material comprises glass.

24. The method of making a prescription optical lens according to claim 1, wherein said optical lens is a laminated optical lens comprising:

a) at least one anterior optical element having a first corrective feature, made according to claim 1, b) at least one posterior optical element having a second corrective feature, made according to claim 1, c) joining said anterior and posterior optical elements by bonding means, wherein, when joined form a laminated optical lens having said required prescription.

25. The method of claim 24, wherein said bonding means is an adhesive and said adhesive has the some index of refraction as said anterior and posterior optical elements.

26. The method of claim 24, wherein said laminated optical lens is made as an ophthalmic lens.

27. A method of changing at least one optical characteristics of an optical device by means of bonding or attaching or securing or joining to said optical device at least one optical-element having at least one surface zone made according to claim 1, and characterized by the macroscopic shape of one of the surfaces of said optical-element being substantially matching to the appropriate surface zone of said optical device.

28. The method of claim 27, wherein said optical device is an eyewear and said optical-element is an ophthalmic lens.

29. The method of claim 27, wherein said surface zone made according to claim 1 is protected by protective means.

30. The method of claim 27, wherein said optical element is bonded to said optical device by using adapting or converting means.

31. A method of changing at least one optical characteristic of an optical device by means of bonding to said optical device at least one optical-element having at least one surface zone made according to claim 1, and characterized by the macroscopic shape of one of the surfaces of said optical-element being substantially matching to the appropriate surface zone of said optical device, wherein said optical-element that has to be bonded to said optical device is backed with an adhesive and said adhesive is being protected by a removable non-adhesive sheet.

* * * * *